US012590179B2

(12) United States Patent
Ul-haq et al.

(10) Patent No.: US 12,590,179 B2
(45) Date of Patent: Mar. 31, 2026

(54) COPOLYMERS AND TERPOLYMERS OF POST MODIFIED POLYACRYLATES AS EFFICIENT GAS HYDRATE INHIBITORS

(71) Applicant: Saudi Arabian Oil Company, Dhahran (SA)

(72) Inventors: Muhammad Imran Ul-haq, Dhahran (SA); Abdullah Al-Malki, Dammam (SA); Hassan Ali Al-Ajwad, Ras Tanura (SA); Taras Y. Makogon, Hedwig Village, TX (US)

(73) Assignee: Saudi Arabian Oil Company, Dhahran (SA)

( * ) Notice: Subject to any disclaimer, the term of this patent is extended or adjusted under 35 U.S.C. 154(b) by 1007 days.

(21) Appl. No.: 17/733,341

(22) Filed: Apr. 29, 2022

(65) Prior Publication Data

US 2023/0348658 A1 Nov. 2, 2023

(51) Int. Cl.

*C08G 61/04* (2006.01)
*C08F 8/32* (2006.01)
*C09K 8/52* (2006.01)

(52) U.S. Cl.

CPC .................................... *C08G 61/04* (2013.01)

(58) Field of Classification Search

CPC ........ C08F 120/14; C08F 8/32; C08F 220/14; C09K 8/528; C09K 2208/22
USPC ......................... 585/15; 525/330.5, 375, 379
See application file for complete search history.

(56) References Cited

U.S. PATENT DOCUMENTS

| | | | |
|---|---|---|---|
| 4,277,580 A | 7/1981 | Allen et al. | |
| 5,413,731 A | 5/1995 | Adler et al. | |
| 5,583,273 A | 12/1996 | Colle et al. | |
| 5,600,044 A | 2/1997 | Colle et al. | |
| 5,841,010 A | 11/1998 | Rabeony et al. | |
| 5,900,516 A * | 5/1999 | Talley | C10L 1/2368 166/371 |
| 6,015,929 A | 1/2000 | Rabeony et al. | |
| 6,107,531 A | 8/2000 | Colle et al. | |
| 6,319,971 B1 | 11/2001 | Keeland et al. | |

(Continued)

FOREIGN PATENT DOCUMENTS

| | | |
|---|---|---|
| CN | 113388379 A | 9/2021 |
| EP | 0245797 A1 | 2/1988 |

(Continued)

OTHER PUBLICATIONS

Van Guyse et al., "Full and Partial Amidation of Poly(methyl acrylate) as Basis for Functional Polyacrylamide (Co) Polymers", Macromolecules, American Chemical Society, 8 pages, Jun. 28, 2019.

(Continued)

*Primary Examiner* — Fred M Teskin
(74) *Attorney, Agent, or Firm* — Dinsmore & Shohl LLP

(57) ABSTRACT

Gas hydrate inhibiting compositions include random polymers prepared from polyacrylates. The random polymers include at least one acrylate ester monomer in combination with at least one amine functional monomer. Methods for synthesizing the gas hydrate inhibiting polymers include polymerization of an acrylate then post-modifying a polyacrylate with an amine from at least one amine compound. Methods for inhibiting formation of clathrate hydrates in a natural gas pipeline include adding the gas hydrate inhibiting polymers to a natural gas pipeline.

20 Claims, 4 Drawing Sheets

(56) References Cited

U.S. PATENT DOCUMENTS

| | | | | |
|---|---|---|---|---|
| 6,451,429 | B2 | 9/2002 | Mumick et al. | |
| 7,585,816 | B2 * | 9/2009 | Colle | C10L 3/00 507/239 |
| 7,662,970 | B2 | 2/2010 | Rivers et al. | |
| 9,145,462 | B2 | 9/2015 | Liu et al. | |
| 10,189,986 | B2 | 1/2019 | Elanany et al. | |
| 10,393,319 | B2 * | 8/2019 | Jones | C10L 3/107 |
| 10,550,215 | B2 | 2/2020 | Elanany et al. | |
| 2008/0221271 | A1 | 9/2008 | Duggal et al. | |
| 2010/0209476 | A1 | 8/2010 | Lim et al. | |
| 2011/0152130 | A1 | 6/2011 | Adidharma et al. | |
| 2013/0261275 | A1 | 10/2013 | Musa et al. | |
| 2014/0148337 | A1 | 5/2014 | Schnabel et al. | |
| 2017/0321108 | A1 | 11/2017 | Majnouni et al. | |

FOREIGN PATENT DOCUMENTS

| | | | |
|---|---|---|---|
| WO | 9325798 | A1 | 12/1993 |
| WO | 9819980 | A1 | 5/1998 |

OTHER PUBLICATIONS

Perrin et al., "The Chemistry of Low Dosage Clathrate Hydrate Inhibitors", Chemical Society Reviews, vol. 42, No. 5, pp. 1996-2015, 2013.

Zhang et al., "A Simple and Direct Route to High-Performance Acrylamido-Based Kinetic Gas Hydrate Inhibitors from Poly(acrylic acid)", Energy & Fuels, vol. 34, pp. 6279-6287, 2020.

* cited by examiner

COPOLYMERS AND TERPOLYMERS OF POST MODIFIED POLYACRYLATES AS EFFICIENT GAS HYDRATE INHIBITORS

TECHNICAL FIELD

The present disclosure generally relates to gas hydrate inhibiting polymers prepared from polyacrylates, to methods for synthesizing the gas hydrate inhibiting polymers, and to methods for inhibiting formation of clathrate hydrates in a natural gas pipeline by application of the gas hydrate inhibiting polymers.

BACKGROUND

Conditions favoring formation of clathrate hydrates are often found in pipelines. With the expansion of offshore gas exploration and production, the formation of clathrate hydrates has become a serious operational concern in both gas transportation and gas processing. Agglomeration and adherence of clathrate hydrates to pipeline walls can reduce gas production, plug sections of the pipeline, and even block the pipeline, thereby leading to a pipeline shutdown. In order to maintain gas production and avoid pipeline shutdown, clathrate hydrate inhibitors have been added to pipeline fluids.

Commercially available clathrate hydrate inhibitors include thermodynamic hydrate inhibitors, which act to modify the conditions at which clathrate hydrates form in pipeline fluids. For example, thermodynamic hydrate inhibitors may be added to pipeline fluids at high concentrations (for example, up to 0.8 weight/weight, that is w/w of the water cut, where the water cut is the mass of water in a sample of pipeline fluid divided by the total mass of all fluids in the sample) to modify the pressure, temperature, or a combination of the pressure and temperature at which clathrate hydrates form. Ethylene glycol (that is, monoethylene glycol or MEG) and methanol are examples of thermodynamic hydrate inhibitors. Another type of commercially available clathrate hydrate inhibitors are low-dose hydrate inhibitors, which act to: (1) kinetically delay clathrate hydrate nucleation, and (2) inhibit clathrate hydrate growth. With regard to kinetically delaying clathrate hydrate nucleation, low-dose hydrate inhibitors may interact with clathrate hydrate nuclei during early formation of clathrate hydrates. With regard to inhibiting clathrate hydrate growth, low-dose hydrate inhibitors may inhibit clathrate hydrate growth by binding to a surface of the clathrate hydrate. Poly(N-vinylcaprolactam) and poly(N-methyl-N-vinylacetamide) are examples of low-dose hydrate inhibitors. A third type of commercially available clathrate hydrate inhibitors are anti-agglomerates, which act to inhibit clathrate hydrate agglomeration. With regard to inhibiting clathrate hydrate agglomeration, anti-agglomerates may inhibit clathrate hydrate agglomeration by adsorbing to clathrate hydrates to prevent massive accumulation of clathrate hydrates. Anti-agglomerates may inhibit clathrate hydrate agglomeration such that clathrate hydrates are kept in the form of a suspension. Examples of anti-agglomerates are based on quaternary ammonium cations.

Recently, thermodynamic hydrate inhibitors have been replaced by commercially available low-dose hydrate inhibitors, because thermodynamic hydrate inhibitors are viewed as being difficult to separate from pipeline fluids, are harmful to the environment, and require high concentrations to be effective. However, commercially available low-dose hydrate inhibitors are also imperfect in that some are inefficient or incompatible with other additives, for example, corrosion inhibitors. Further, commercially available low-dose hydrate inhibitors that are capable of inhibiting clathrate hydrates having a structure (Type) I (that is, SI) crystalline structure under severe conditions, for example, extreme subcooling temperatures and pressure, are limited. Moreover, commercially available low-dose hydrate inhibitors, which are capable of inhibiting clathrate hydrates having a SI crystalline structure, are limited to a narrow subcooling temperature range. Also, anti-agglomerates are imperfect in that they fail to inhibit formation of clathrate hydrates.

SUMMARY

There is an ongoing need for gas hydrate inhibitor compounds, gas hydrate inhibitor compositions containing the compounds, and methods for inhibiting gas hydrates.

Gas hydrate inhibitor compositions according to the present disclosure include a random polymer according to formula (I):

(I)

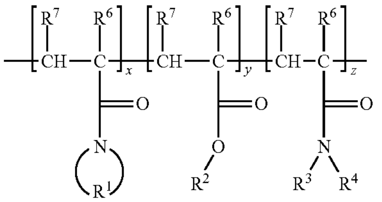

In formula (I), $R^1$ is independently $(C_4\text{-}C_7)$hydrocarbylene or $(C_4\text{-}C_7)$heterohydrocarbylene and is optionally substituted with at least one $(C_1\text{-}C_3)$alkyl; $R^2$ is independently $(C_1\text{-}C_{10})$hydrocarbyl or $(C_1\text{-}C_{10})$heterohydrocarbyl; $R^3$ is independently hydrogen or $(C_1\text{-}C_8)$ saturated alkyl; $R^4$ is independently $(C_1\text{-}C_8)$ saturated alkyl; each $R^6$ is independently selected from hydrogen, methyl, ethyl, or —$CH_2OH$; each $R^7$ is independently selected from hydrogen, $(C_1\text{-}C_5)$ alkyl, dialkylamine, or —CN; x is a molar fraction from 0 to 0.99; y is a molar fraction from 0.01 to 0.50; z is a molar fraction from 0 to 0.99; the sum of x and z is from 0.50 to 0.99; and the sum of x, y, and z is 1.

Further gas hydrate inhibitor compositions polymers according to formula (I), in which z is zero, each $R^7$ is hydrogen, and the random polymer according to formula (I) has formula (Ia):

(Ia)

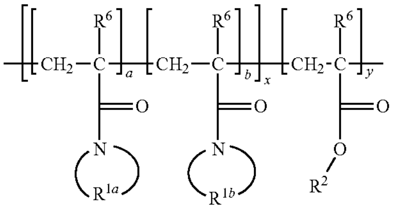

In formula (Ia), $R^{1a}$ and $R^{1b}$ are selected from $(C_4\text{-}C_7)$ hydrocarbylene or $(C_4\text{-}C_7)$heterohydrocarbylene, and are optionally substituted with at least one $(C_1\text{-}C_3)$alkyl; $R^{1a}$ and $R^{1b}$ are different from each other; each $R^6$ is as defined in formula (I); a and b are respective molar fractions, based on only the monomers adding to the molar fraction x of the random polymer; a and b are from 0.30 to 0.70, where the sum of a and b is 1; x is from 0.50 to 0.99; and y is from 0.01 to 0.50.

The gas hydrate inhibitors disclosed herein may be employed in a natural gas pipeline having a natural gas stream. Accordingly, a natural gas pipeline may include a gas hydrate inhibitor composition in fluidic communication with the natural gas stream.

Methods of inhibiting gas hydrate formation in natural gas pipelines include adding a gas hydrate inhibitor composition including the random polymer of formula (I) to a natural gas pipeline, to inhibit formation of gas hydrates in the natural gas pipeline when a natural gas stream is flowing through the natural gas pipeline.

Methods of preparing a gas hydrate inhibitor including the random polymer according to formula (I) include polymerizing alkyl acrylate monomers by free radical polymerization to obtain a poly(alkyl acrylate), the alkyl acrylate monomers having formula (II):

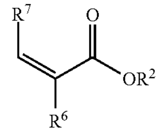

(II)

In formula (II), $R^2$, $R^6$, and $R^7$ are as defined in formula (I). The poly(alkyl acrylate) has formula (III):

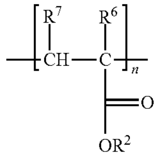

(III)

In formula (III), $R^2$, $R^6$, and $R^7$ are as defined in formula (I), and n is from 5 to 500.

The methods of preparing a gas hydrate inhibitor further include reacting the poly(alkyl acrylate) of formula (III) with at least one amine compound in the presence of a proton acceptor to obtain the polymer of formula (I) upon replacement of fewer than all groups —$OR^2$ of the poly (alkyl acrylate) with an amine from the at least one amine compound, the at least one amine compound being selected from compounds according to formula (IV), compounds according to formula (V), and combinations thereof:

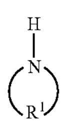

(IV)

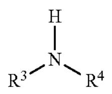

(V)

In formulas (IV) and (V), $R^1$, $R^3$, and $R^4$ are as defined in formula (I).

DETAILED DESCRIPTION

Figure 1A:
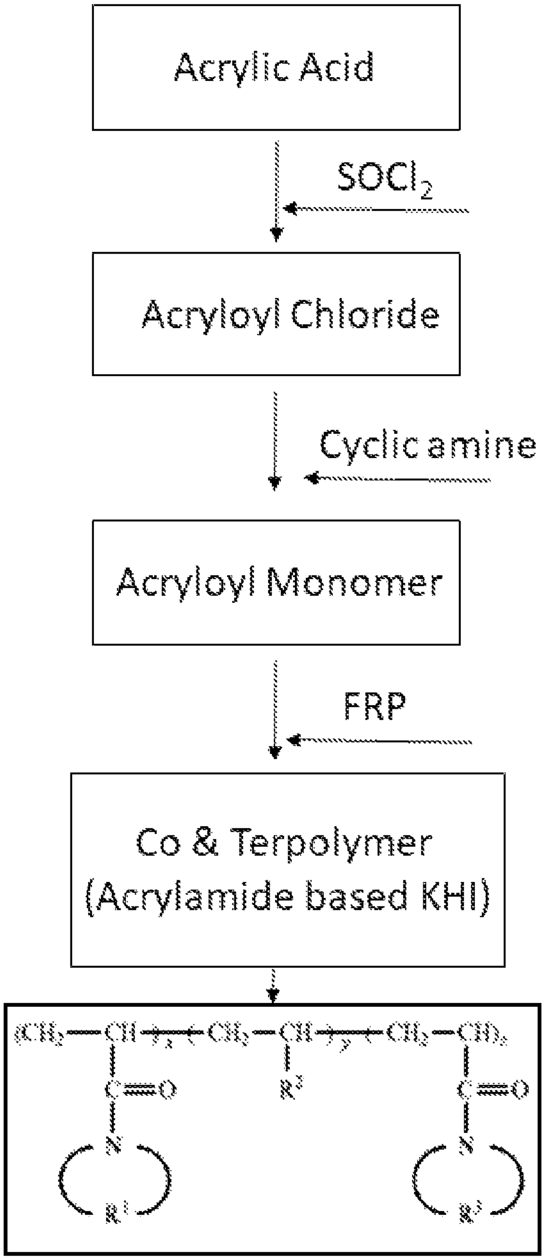
FIG. 1A is a flowchart of a synthetic method to acrylamide copolymers and terpolymers from acrylic acid and acryloyl monomers.

While the following terms are believed to be well understood by one of ordinary skill in the art, definitions are set forth to facilitate explanation of the present-disclosed subject matter.

The term "copolymer" refers to a polymer having two or more different monomeric repeating units. For example, the copolymer may include two different monomeric repeating units (that is, a bipolymer). Alternatively, the copolymer may include three different monomeric repeating units (that is, a terpolymer). In one or more embodiments, the copolymers are random. As will be appreciated by one of ordinary skill in the art, the copolymers are random when the distribution of monomeric repeating units follows statistical laws. For example, copolymers are random when the probability of finding a given monomeric repeating unit at a particular point in the polymer chain is equal to the mole fraction of that monomeric repeating unit in the chain. Random copolymers may also be referred to as statistical copolymers.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x\text{-}C_y)$" parenthetical may contain more than y carbon atoms depending on the identity of any groups $R^S$. For example, a "$(C_1\text{-}C_{50})$alkyl substituted with exactly one group $R^S$, where $R^S$ is phenyl (—$C_6H_5$)" may contain from 7 to 56 carbon atoms. Thus, in general when a chemical group defined using the "$(C_x\text{-}C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$).

The term "($C_1$-$C_{50}$)hydrocarbyl" means a hydrocarbon radical of from 1 to 50 carbon atoms and the term "($C_1$-$C_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a ($C_1$-$C_{50}$)hydrocarbyl may be an unsubstituted or substituted ($C_1$-$C_{50}$)alkyl, ($C_3$-$C_{50}$)cycloalkyl, ($C_3$-$C_{20}$)cycloalkyl-($C_1$-$C_{20}$)alkylene.

The terms "($C_1$-$C_{50}$)alkyl" and "($C_1$-$C_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted ($C_1$-$C_{50}$)alkyl are unsubstituted ($C_1$-$C_2$M)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_3$-$C_{50}$)cycloalkyl" means a saturated cyclic hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{50}$)hydrocarbylene include unsubstituted or substituted ($C_6$-$C_{50}$)arylene, ($C_3$-$C_{50}$)cycloalkylene, and ($C_1$-$C_{50}$)alkylene (e.g., ($C_1$-$C_2$M)alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of ($C_2$-$C_{20}$)alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of ($C_6$-$C_{50}$) arylene α,ω-diradicals include phenyl-1,4-diyl, napthalen-2,6-diyl, or napthalen-3,7-diyl.

The term "($C_1$-$C_{50}$)alkylene" means a saturated straight chain or branched chain diradical (i.e., the radicals are not on ring atoms) of from 1 to 50 carbon atoms that is unsubstituted or substituted by one or more $R^S$. Examples of unsubstituted ($C_1$-$C_{50}$)alkylene are unsubstituted ($C_1$-$C_2$M)alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—; examples of substituted ($C_1$-$C_{50}$)alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis(methylene)bicyclo [2.2.2] octane.

The term "($C_3$-$C_{50}$)cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, —N═$C(R^C)_2$, —$Ge(R^C)_2$—, or —$Si(R^C)$—, where each $R^C$ and each $R^P$ is unsubstituted ($C_1$-$C_{18}$)hydrocarbyl or —H, and where each R is unsubstituted ($C_1$-$C_{18}$)hydrocarbyl. The term "heterohydrocarbon" refers to a molecule or molecular framework in which one or more carbon atoms of a hydrocarbon are replaced with a heteroatom. The term "($C_1$-$C_{50}$)heterohydrocarbyl" means a heterohydrocarbon radical of from 1 to 50 carbon atoms, and the term "($C_1$-$C_{50}$)heterohydrocarbylene" means a heterohydrocarbon diradical of from 1 to 50 carbon atoms. The heterohydrocarbon of the ($C_1$-$C_{50}$)heterohydrocarbyl or the ($C_1$-$C_{50}$)heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each ($C_1$-$C_{50}$)heterohydrocarbyl and ($C_1$-$C_{50}$)heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The ($C_1$-$C_{50}$)heterohydrocarbyl may be unsubstituted or substituted. Non-limiting examples of the ($C_1$-$C_{50}$)heterohydrocarbyl include ($C_1$-$C_{50}$)heteroalkyl, ($C_1$-$C_{50}$)hydrocarbyl-O—, ($C_1$-$C_{50}$)hydrocarbyl-S—, ($C_1$-$C_{50}$)hydrocarbyl-S(O)—, ($C_1$-$C_{50}$)hydrocarbyl-$S(O)_2$—, ($C_1$-$C_{50}$)hydrocarbyl-$Si(R^C)_2$—, ($C_1$-$C_{50}$)hydrocarbyl-$N(R^N)$, ($C_1$-$C_{50}$)hydrocarbyl-$P(R^P)$—, ($C_2$-$C_{50}$)heterocycloalkyl, ($C_2$-$C_{19}$)heterocycloalkyl-($C_1$-$C_2$M)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{50}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_1$-$C_{50}$)heteroalkyl" means a saturated straight or branched chain radical containing one to fifty carbon atoms and one or more heteroatom. The term "($C_1$-$C_{50}$)heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted ($C_2$-$C_{40}$)heterocycloalkyl include unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "aliphatic" refers to a unsaturated or saturated, linear or branched hydrocarbon radicals that is nonaromatic. In embodiments, the aliphatic hydrocarbon radicals are monovalent or divalent. As will be appreciated by one of ordinary skill in the art, aliphatic is intended to include, but is not limited to, alkyl moieties. Thus, the term "alkyl" includes straight and branched alkyl groups. In certain embodiments, the term "lower alkyl" may be used to indicate alkyl groups (branched or unbranched) having from 1 to 6 carbon atoms.

The term "clathrate hydrates" refers to crystalline water-based solids in which host water molecules enclathrate gas guest molecules. In one or more embodiments, crystalline water-based solids in which host water molecules are hydrogen bonded around the gas guest molecules such that the gas guest molecules are trapped inside cages of hydrogen bonded host water molecules. The clathrate hydrates may include a structure (Type) I (that is, SI), a structure (Type) II (that is, SII), or a structure (Type) H (that is, SH) crystalline structure.

The terms "inhibit", "inhibition", and "inhibiting" refer to any improvement in controlling, delaying, reducing, mitigating, preventing, or combination thereof the formation, growth, adherence, agglomeration, or combination thereof of clathrate hydrates in any manner. For example, clathrate hydrate inhibition includes, but should not be limited to, thermodynamically modifying the conditions at which clathrate hydrates form, kinetically delaying clathrate hydrate nucleation, dissolving clathrate hydrates, breaking up clathrate hydrates, or combination thereof. Further, clathrate hydrate inhibition may include the complete cessation of clathrate hydrate formation, where clathrate hydrate formation is entirely prevented.

The terms "formation", "forming", and "form" refer to any process in which host water molecules enclathrate gas guest molecules in a crystalline structure, in which clathrate hydrates grow, in which clathrate hydrates adhere, in which clathrate hydrates agglomerate, or combination thereof. The term "enclathrate" refers to hydrogen bonding of host water molecules around gas guest molecules.

The terms "subcooling temperature" and "$T_{se}$" refer to the difference between an operating temperature of a field gas and the three-phase equilibrium temperature of the clathrate hydrate of the field gas at 140 bars. Thus, the term "first subcooling temperature" refers to the difference between an operating temperature of a field gas in a first operation stage and the three-phase equilibrium temperature. In embodiments, the first subcooling temperature is from about 0° C. to about 4.0° C., or from about 0° C. to about 1.0° C., or from about 1.0° C. to about 2.0° C., or from about 2.0° C. to about 3.5° C., or about 4.0° C. Similarly, the term "second subcooling temperature" refers to the difference between an operating temperature of a field gas in a second operation stage and the three-phase equilibrium temperature. In embodiments, the second subcooling temperature is from about 4.0° C. to about 5.6° C., or from about 4.0° C. to about 4.6° C., or from about 4.6° C. to about 5.0° C., or from about 5.0° C. to about 5.6° C., or about 5.6° C. Additionally, the term "third subcooling temperature" refers to the difference between an operating temperature of a field gas in a third operation stage and the three-phase equilibrium temperature. In embodiments, the third subcooling temperature is from about 5.6° C. to about 10.5° C., or from about 5.6° C. to about 7.0° C., or from about 7.0° C. to about 8.6° C., or from about 8.6° C. to about 10.0° C., or about 10.5° C.

Embodiments of the present disclosure are directed to gas hydrate inhibitor compositions comprising a polymer having formula (I), to methods for synthesizing the polymers having formula (I), and to methods for inhibiting formation of clathrate hydrates in a natural gas pipeline by application of polymers having formula (I). The polymers having formula (I) will now be described in detail. Thereafter, embodiments of methods for synthesizing polymers of formula (I) will be described.

Gas hydrate inhibitor compositions according to this disclosure include a polymer having formula (I):

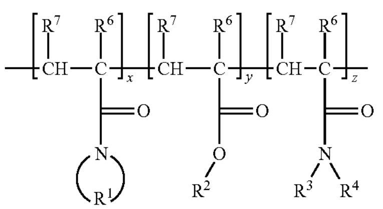

(I)

In the polymer of formula (I), $R^1$ is independently ($C_4$-$C_7$)hydrocarbylene or ($C_4$-$C_7$)heterohydrocarbylene. The ($C_4$-$C_7$)hydrocarbylene optionally may be substituted with at least one ($C_1$-$C_3$)alkyl at any carbon atom. The ($C_4$-$C_7$) heterohydrocarbylene optionally may be substituted with one or more groups $R^S$ at any carbon atom, where each $R^S$ is a ($C_1$-$C_{10}$)alkyl or a ($C_1$-$C_3$)alkyl. Non-limiting examples of $R^S$ include methyl, ethyl, n-propyl, 2-propyl, n-butyl, or tert-butyl. Generally, the monomers represented by the subscript x in the polymer according to formula (I) include a 5- to 8-membered ring joined to the acrylate carbonyl through a tertiary amino nitrogen atom. In some embodiments, group $R^1$ is identical in all monomers of the polymer of formula (I). In other embodiments, the polymer of formula (I) includes monomers encompassed by subscript x, in which at least two, at least three, or at least four different groups $R^1$ are present.

In examples of polymers according to formula (I), $R^1$ may be independently ($C_4$-$C_7$)alkylene or ($C_4$-$C_7$)heteroalkylene. In some embodiments, $R^1$ may be independently ($C_4$-$C_7$) heteroalkylene including one or two heteroatoms selected from oxygen, nitrogen, or sulfur. Further examples of $R^1$ include $—(CH_2)_4—$, $—(CH_2)_5—$, and $—(CH_2)_2—O—(CH_2)_2—$.

As previously noted, $R^1$ optionally may be substituted with one or more groups $R^S$ at any carbon atom. In embodiments where $R^1$ and $R^3$ are 1 to 3 group $R^S$. $R^S$ may be ($C_1$-$C_{10}$)alkyl. In embodiments where $R^1$ and $R^3$ are chosen from ($C_4$-$C_7$)alkylene, and $R^1$ and $R^3$ include group $R^S$, $R^S$ is selected from the group methyl, ethyl, n-propyl, 2-propyl, n-butyl, or tert-butyl.

Non-limiting, illustrative examples of the moiety

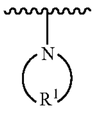

of the polymers of formula (I) include:

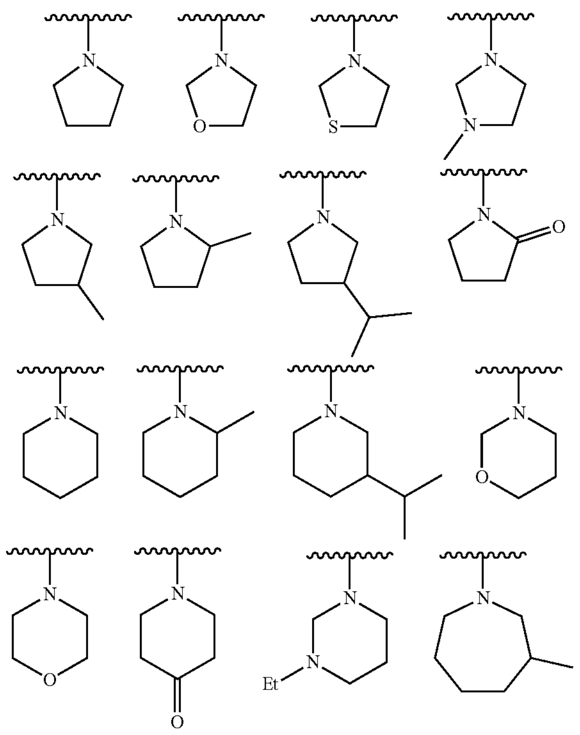

In the polymer of formula (I), $R^2$ is independently ($C_1$-$C_{10}$)hydrocarbyl or ($C_1$-$C_{10}$)heterohydrocarbyl. Non-limiting examples of $R^2$ as a ($C_1$-$C_{10}$)hydrocarbyl include methyl, ethyl, propyl, butyl, cyclopentyl, cyclohexyl, phenyl, 1-phenylmethyl(benzyl), and 2-phenylethyl. Non-limiting examples of $R^2$ as a ($C_1$-$C_{10}$)heterohydrocarbyl include $—[(CH_2)_2—O—]_n—CH_2CH_3$, where n is from 1 to 5; and $—(CH_2)_2NR_2$, where each R is a ($C_1$-$C_5$) alkyl. In various embodiments, $R^2$ is independently ($C_1$-$C_5$)alkyl or ($C_4$-$C_5$) cycloalkyl.

Generally, the monomers represented by the subscript y are acrylate ester monomers polymerized by an initial polymerization to form a poly(alkyl acrylate) having but not modified during a subsequent step when the $—OR^2$ groups are replaced by amino groups to form monomers represented by either subscript x or subscript z. In some embodiments, group $R^2$ is identical in all monomers of the polymer of formula (I). In other embodiments, the polymer of formula (I) includes monomers encompassed by subscript y, in which at least two, at least three, or at least four different groups $R^2$ are present.

In the polymer of formula (I), the monomers represented by subscript z include a secondary amine or a non-cyclic tertiary amine bonded to the acrylate carbonyl. Accordingly, $R^3$ is independently hydrogen or ($C_1$-$C_8$) saturated alkyl; and $R^4$ is independently ($C_1$-$C_8$) saturated alkyl. When $R^3$ is not hydrogen, $R^3$ and $R^4$ may be the same or different. The ($C_1$-$C_8$) saturated alkyl of $R^3$ and $R^4$ may be linear or cyclic. Non-limiting examples of the ($C_1$-$C_8$) saturated alkyl of $R^3$ and $R^4$ include methyl, ethyl, propyl, 1-methylethyl(isopropyl), butyl, 1,1-dimethylethyl (tert-butyl), pentyl, cyclopentyl, cyclohexyl, 1-cyclopentyl methyl, 2-cyclopentyl ethyl, 1-cyclohexyl methyl, and 2-cyclohexyl ethyl. In some embodiments, group $R^3$ is identical in all monomers of the polymer of formula (I). In other embodiments, the polymer of formula (I) includes monomers encompassed by subscript z, in which at least two, at least three, or at least four different groups $R^3$ are present.

In the polymer of formula (I), each $R^6$ is independently selected from hydrogen; alkyl such as methyl, ethyl, propyl, butyl, or pentyl; —CN; $—N(CH_3)_2$; or $—CH_2OH$. Polymers of formula (I) for which all $R^6$ are hydrogen are derived by modifying a polyalkylacrylate polymer according to methods of this disclosure. In the polymer of formula (I), all groups $R^6$ may be identical or different. Polymers of formula (I) for which all $R^6$ are methyl are derived by modifying a polyalkylmethacrylate polymer according to methods of this disclosure. Polymers of formula (I) for which all $R^6$ are any alkyl are derived by modifying a polyalkylalkylacrylate polymer according to methods of this disclosure. In a further, non-limiting example, the polymer of formula (I) may include some groups $R^6$ that are hydrogen and others that are alkyl, such as methyl. Polymers of formula (I) for which some $R^6$ hydrogen and some $R^6$ are methyl are derived by modifying a poly(alkylacrylate-co-alkylmethacrylate) polymer according to methods of this disclosure.

In the polymer of formula (I), each $R^7$ is independently selected from hydrogen, ($C_1$-$C_5$)alkyl, dialkylamine, or —CN. In the polymer of formula (I), all groups $R^7$ may be identical or different. Examples of ($C_1$-$C_5$)alkyl include methyl, ethyl, propyl, 1-methylethyl (isopropyl), butyl, and 1,1-dimethylethyl (tert-butyl). Examples of dialkylamines include dimethylamine, diethylamine, and methylethylamine. In one non-limiting example, none of the groups $R^7$ is hydrogen and all other groups $R^7$ are selected from ($C_1$-$C_5$) alkyl, dialkylamine, or —CN. In another non-limiting example, some of groups $R^7$ are hydrogen and all other groups $R^7$ are selected from ($C_1$-$C_5$)alkyl, dialkylamine, or —CN. In another non-limiting example, all groups $R^7$ are hydrogen.

In the polymer of formula (I), the subscripts x, y, and z each represent a molar fraction of the respective particular types of monomer, based on all monomers of the polymer. Furthermore, subscripts x, y, and z each represent the sum of all monomers of the polymer having the structure conforming to the monomer indicated in formula (I). Thus, the sum of x, y, and z equals one, representing 100% of all monomers in the polymer. In an illustrative example, a polymer of formula (I) in which x is 0.50, y is 0.30, and z is 0.20 is composed of a certain number of monomers, of which, 50% are cyclic amine-type monomers, 30% are acrylate ester-type monomers, and 20% are primary or secondary amine-type monomers. The polymers of formula (I) may be composed of from 5 to 2000 individual monomers, for example. The number percentages of monomers in a polymer of formula (I) may be assessed by common analytical techniques. Particularly if the polymer of formula (I) is prepared from an initial polyalkyacrylate homopolymer for which the molecular weight is known and, hence, the number of monomers, the molar amounts of a individual monomers in a post-modified polymer according to formula (I) may be ascertained quantitatively from analytical techniques by assessing signature peaks attributable to the various monomers. In some embodiments, the polymer according to formula (I) may have a weight average molecular weight from about 500 g/mol to about 25,000 g/mol In the polymer of formula (I) is a molar fraction from 0 to 0.99; y is a molar fraction from 0.01 to 0.50; and z is a molar fraction from 0 to 0.99. Furthermore, the sum of subscripts x and z is from 0.50 to 0.99. Based on these particular ranges, the polymer of formula (I) necessarily includes at least some alkyl acrylate ester monomers including the group $—OR^2$. In addition to the alkyl acrylate ester monomers, the polymer of formula (I) necessarily includes (1) cyclic amino-type monomers only (when subscript z is zero); (2) secondary or non-cyclic tertiary amino-type monomers (when subscript x is zero); or both (1) and (2) (when both x and z are non-zero).

In illustrative embodiments, subscript x is from 0 to 0.40; subscript y is from 0.05 to 0.20; subscript z is from 0 to 0.40; and the sum of x and z is from 0.80 to 0.95. In further illustrative embodiments, subscript x is from about 0.1 to about 0.9, from about 0.25 to about 0.75, or from about 0.33 to about 0.66, or about 0.5. In illustrative, non-limiting embodiments, subscript x greater than 0. In illustrative embodiments, subscript y is a molar fraction from about 0.1 to about 0.9, or from about 0.25 to about 0.75, or from about 0.33 to about 0.66, or about 0.5. In embodiments, subscript z is a molar fraction from 0 to about 0.8, or from about 0.25 to about 0.5, or about 0.33. In embodiments, z is greater than 0.

Polymers of formula (I) include copolymers of exactly two unique monomers and terpolymers of exactly three unique monomers. Polymers of formula (I) further include polymers having four, five, six, seven, eight, nine, ten, or even more than ten unique monomers, provided each unique monomer may be included in one of the monomer structures of formula (I) encompassed under subscript x, subscript y, or subscript z. The polymers of formula (I) may include block copolymers or random copolymers.

The gas hydrate inhibitor compositions herein may include polymers of formula (I), in which subscript z is zero, whereby the polymer of formula (I) is a polymer according to formula (Ia):

(Ia)

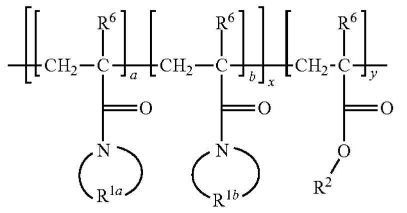

It should be readily understood that all polymers according to formula (Ia) are also polymers according to formula (I). In the polymer of formula (Ia), $R^{1a}$ and $R^{1b}$ are selected from ($C_4$-$C_7$)hydrocarbylene or ($C_4$-$C_7$)heterohydrocarbylene, and are optionally substituted with at least one ($C_1$-$C_3$)alkyl. Also in the polymer of formula (Ia), $R^{1a}$ and $R^{1b}$ are different from each other. Each $R^6$ is as defined in formula (I).

In the polymer of formula (Ia), subscript x is from 0.50 to 0.99, and subscript y is from 0.01 to 0.50. As in formula (I), the subscripts x and y represent molar fractions of the respective monomers, based on the total number of monomers in the polymer.

In the polymer of formula (Ia), subscripts a and b are respective molar fractions, based on only the monomers adding to the molar fraction x of the random polymer. Subscripts a and b are from 0.30 to 0.70, or from 0.40 to 0.60, or from 0.45 to 0.55, for example. The sum of a and b is one. In an illustrative example, a polymer of formula (Ia) for which subscript x is 0.60 and subscript y is 0.40 is composed of 60% cyclic amine monomers and 40% acrylate ester monomers. If, in the same polymer, subscript a is 0.30 and subscript b is 0.70, the full polymer would be described as being composed of 18% (60% x 0.3) monomers encompassed by subscript a, 42% (60%×0.7) monomers encompassed by subscript b, and 40% monomers encompassed by subscript y, for a total of 100%.

In non-limiting example polymers of formula (Ia), $R^{1a}$ and $R^{1b}$ are independently a ($C_4$-$C_7$)alkylene or a ($C_4$-$C_7$) heteroalkylene comprising at least one heteroatom selected from the group consisting of oxygen, nitrogen, and sulfur; and $R^2$ is ($C_1$-$C_5$)alkyl or ($C_4$-$C_5$)cycloalkyl. In a specific non-limiting example polymer of formula (Ia), $R^{1a}$ is $—(CH_2)_4—$; $R^{1b}$ is $—(CH_2)_5—$; $R^2$ is methyl; and the polymer according to formula (Ia) has a weight average molecular weight from 500 g/mol to 25,000 g/mol.

The viscosity average molecular weight of the copolymers of formula (I) is from about 500 grams/mole (that is g/mol) to about 1,000,000 g/mol, or from about 750 g/mol to about 500,000 g/mol, or from about 1,000 g/mol to about 100,000 g/mol, or from about 2,500 g/mol to about 20,000 g/mol. In embodiments, the viscosity average molecular weight of the copolymers was determined via gel permeation chromatography (that is, GPC), employing 0.7% trimethylamine in tetrahydrofuran (that is, THF) as a mobile phase, Phenogel™ (Phenomenex, Sutter Creek, CA) as stationary phases (of differing pore sizes, 500 Å, 100 Å, and 50 Å) in three columns in series, with a refractive index detector (that is, RID). Calibration was performed using polystyrene standards. Moreover, the viscosity average molecular weight of the copolymers of General Formula (I) as determined by GPC was confirmed via sulfur elemental analysis.

In illustrative, non-limiting examples, the viscosity average molecular weight of the copolymers of formula (I) is from about 500 g/mol to about 25,000 g/mol. In alternative illustrative, non-limiting examples, the viscosity average molecular weight of the copolymers of formula (I) is from about 500 g/mol to about 20,000 g/mol.

In embodiments, the polymer of formula (I) is water soluble. In further embodiments, the at least one copolymer of formula (I) is thermally stable. In illustrative, non-limiting embodiments, the at least one copolymer of formula (I) is thermally stable up to a temperature of about 60° C.

The gas hydrate inhibitor compositions may further include, in addition to the polymer of formula (I), a solvent in which the polymer of formula (I) is dissolved. Example solvents include water, alcohols, for example, monoethylene glycol, methanol, ethanol, and isobutanol, ketones, ethers, and non-polar aromatics, for example, toluene and benzene. In further illustrative, non-limiting embodiments, the solvents are alcohols chosen from glycols, for example, monoethylene glycol. The solvent may be an organic solvent such as an alcohol, a ketonic solvent, or an aromatic solvent. The solvent may be chosen from monoethylene glycol, diethylene glycol monomethyl ether, butoxy ethanol, and combinations thereof.

In some embodiments, the gas hydrate inhibitor composition may further include one or more additives. The additives, if present, are chosen from corrosion inhibitors and synergists. In illustrative, non-limiting embodiments, the corrosion inhibitors include gas corrosion inhibitors. In embodiments, the synergists are chosen from scale inhibitors, thermodynamic hydrate inhibitors, low dose hydrate inhibitors, and anti-agglomerates. In illustrative, non-limiting embodiments, the thermodynamic hydrate inhibitors are chosen from glycol ethers and methanol. In illustrative, non-limiting embodiments, low dose hydrate inhibitors are chosen from Poly(N-vinylcaprolactam) and poly(N-methyl-N-vinylacetamide).

Further embodiments may be directed to a natural gas pipeline comprising a natural gas stream and a gas hydrate inhibitor composition as previously described, where the gas hydrate inhibitor is in fluidic communication with the natural gas stream, so as to prevent formation of clathrate hydrates. The natural gas stream may have a water content from 0.10 wt. % to 95.0 wt. %, based on the total weight of all fluids in the natural gas stream. The natural gas pipeline may have a pressure of from 40 bars to 200 bars.

Polymer Synthesis

Figure 1B:
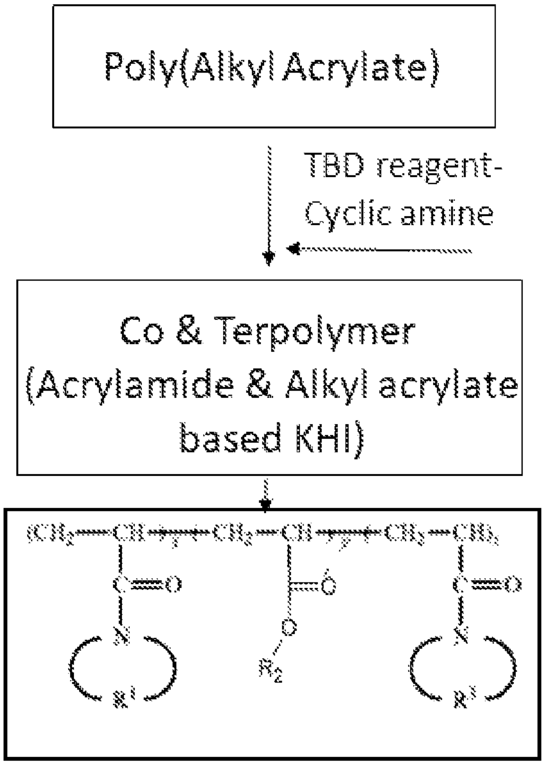
FIG. 1B is a flowchart of a synthetic method to acrylamide copolymers and terpolymers from poly(alkyl acrylates).
Figure 2:
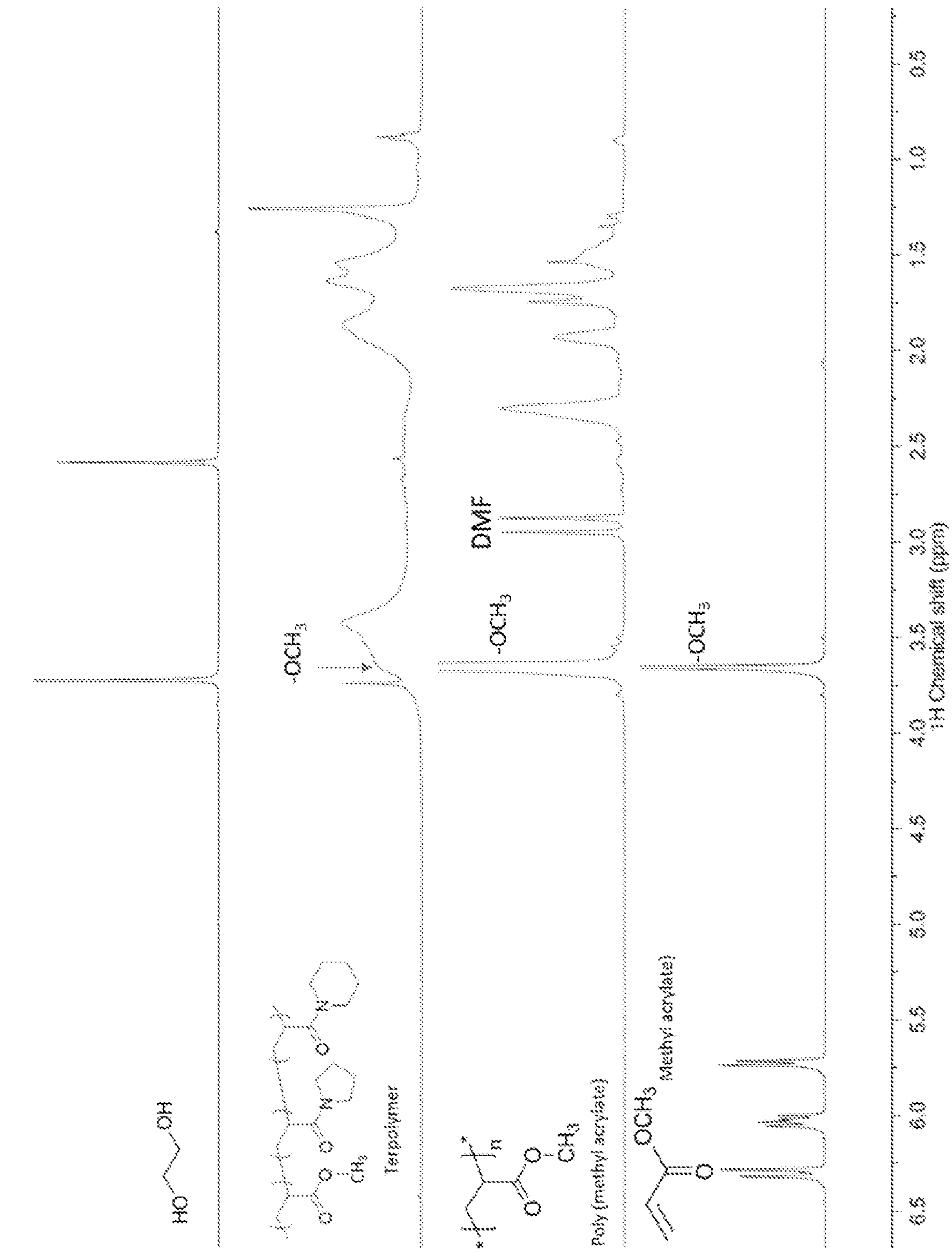
FIG. 2 shows stacked Hydrogen NMR ($^1$H-NMR) spectra of a methyl acrylate monomer, poly(methyl acrylate), the terpolymer according to this disclosure, and ethylene glycol.

Referring to FIG. 1A, by copolymers and terpolymers may be synthesized by reacting acrylic acid and a chlorinating agent, such as thionyl chloride ($SOCl_2$), to form an acid chloride, specifically acryloyl chloride. However, acryloyl chloride is unstable, and hydrochloric acid is a byproduct of the reaction that, in turn, causes the starting material to be difficult to handle. The acryloyl chloride is reacted with an amine, such as a cyclic amine, and then the monomers are polymerized. The total number of steps to produce the terpolymer is three. Referring to FIG. 1B, in contrast, the gas hydrate inhibitor compositions including the polymers according to formula (I) as previously described are synthesized by a one-step route through post modification of a polyalkylacrylate, rather than the complex and disadvantageous route of assembling a polymer from its individual monomers. Synthetic methods for the polymers according to formula (I) will now be described.

Methods of preparing polymers of formula (I), as previously described, for a gas hydrate inhibitor composition, include first polymerizing alkyl acrylate monomers by free radical polymerization to obtain a poly(alkyl acrylate). The alkyl acrylate monomers have formula (II):

(II)

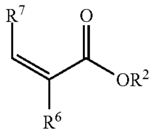

In formula (II), $R^2$, $R^6$, and $R^7$ are as defined in formula (I). Further, it should be understood that formula (II) indicates only that one group $R^7$ is bonded to the olefin that results in polymerization, without intent to imply that the group $R^7$ is necessarily in a cis or a trans relation to group $R^6$ about the double bond. Therefore, formula (II) is to be regarded as covering both the cis and trans configurations with respect to $R^6$ and $R^7$.

The polymerization may be conducted with a single alkyl acrylate monomer, so as to provide a homopolymer, or may be conducted with multiple alkyl acrylate monomers, so as to provide a copolymer of two, three, four, five, or more than five types of monomers. Non limiting, illustrative examples of alkyl acrylate monomers of formula (II) include any of the following, or combinations thereof:

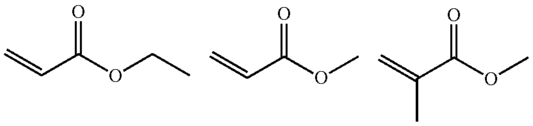

-continued

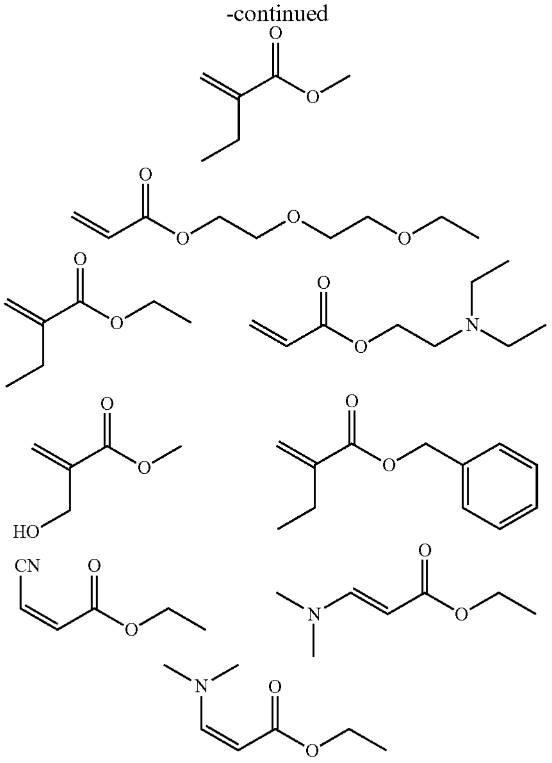

Generally, the poly(alkyl acrylate) obtained from the initial polymerization has formula (III):

(III)

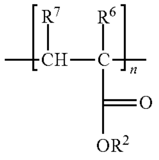

In formula (III), $R^2$, $R^6$, and $R^7$ are as defined in formula (I) and formula (II). Subscript n, referring to the number of individual monomers in the poly (alkyl acrylate), may be from 5 to 5000, from 5 to 1000, from 5 to 500, from 5 to 100, from 10 to 1000, from 10 to 500, from 10 to 100, from 20 to 500, or from 20 to 100, for example.

The methods for preparing polymers of formula (I) for a gas hydrate inhibitor composition further include a post-modification step of the poly(alkyl acrylate). The post-modification step includes reacting the poly(alkyl acrylate) of formula (III) with at least one amine compound in the presence of a proton acceptor to obtain the polymer of formula (I). The synthesis is conducted with appropriate stoichiometric amounts of the at least one amine compound so that only a portion of the ester groups on the acrylate monomers are replaced with amine functionalities. That is, the polymer of formula (I) is obtained upon replacement of fewer than all groups —$OR^2$ of the poly(alkyl acrylate) with an amine from the at least one amine compound. In this regard, the polymer according to formula (I) includes amine-functionalized monomers resulting from the post-modification reaction and acrylate ester monomers that are monomers of the poly(alkyl acrylate) that remained unreacted after the post-modification.

In the post-modification step, the at least one amine compound is selected from compounds according to formula (IV), compounds according to formula (V), and combinations thereof:

(IV)

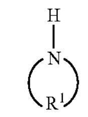

(V)

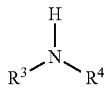

In formulas (IV) and (V), $R^1$, $R^3$, and $R^4$ are as defined in formula (I). In illustrative, non-limiting embodiments, the at least one amine compound is independently selected from any of the following compounds, or combinations thereof:

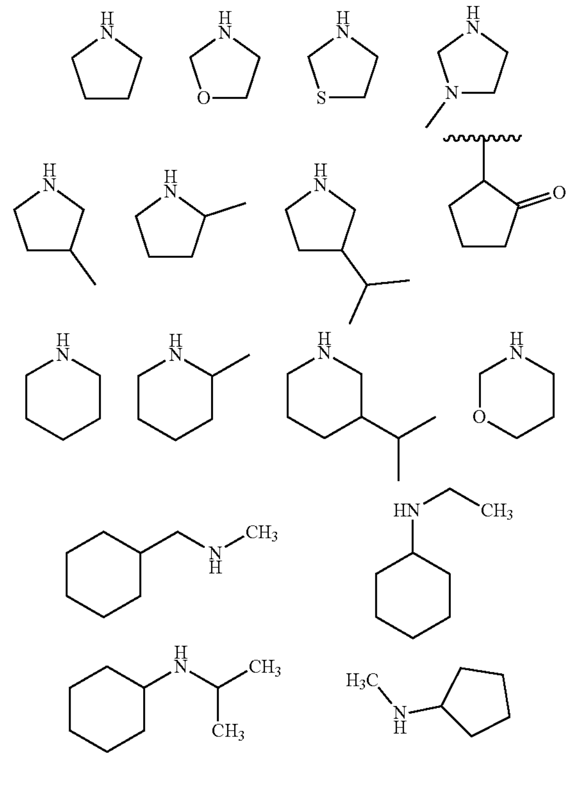

In a non-limiting example, the compounds of formula (IV) and the compounds of formula (V) are selected from substituted piperidines, unsubstituted piperidines, substituted pyrroles, or unsubstituted pyrroles.

The post-modification step of reacting the poly(alkyl acrylate) of formula (III) with the at least one amine compound is conducted in the presence of a proton acceptor that enables the replacement reactions of amine groups in place of acrylate esters. Any suitable reagent that enables the replacement reactions to occur may be chosen, and in some regards, the choice of reagent may affect selectivity, yield, and end amounts of various monomers in the polymer of formula (I). A non-limiting example of a suitable proton acceptor is triazabicyclodecene.

The post-modification step may be conducted in a single, one-pot reaction, or in multiple stages. For example, if the polymer of formula (I) is intended to be a terpolymer of two types of amine-functionalized monomers and the acrylate ester monomer, two unique amine compounds are required for the post-modification. The two unique compounds may both have formula (IV), may both have formula (V), or may be one compound of formula (IV) and one compound of formula (V). In example of the post-modification step, the poly(alkyl acrylate) is reacted with a first amine compound of formula (IV) or formula (V) and a second amine compound of formula (IV) or formula (V) in a single reaction or in two separate reactions. In a single-reaction approach, the poly(alkyl acrylate) of formula (II) is reacted with both amine compounds at the same time by combining the poly(alkyl acrylate), the first amine compound, and the second amine compound in a single reaction vessel to obtain the polymer of formula (I). In a two-reaction approach, the poly(alkyl acrylate) is reacted with only the first amine compound, then the product of the first reaction is combined to react with the second amine compound to obtain the polymer of formula (I).

Method of Inhibiting Gas Hydrates Formation

As previously described, the terms "inhibiting" or "inhibitor" generally many improvement in preventing, controlling, delaying, reducing or mitigating the formation, growth or agglomeration of hydrocarbon hydrates in any manner. Although the term inhibitor is not intended to be restricted to the complete cessation of gas hydrates formation, it may include the possibility that the formation of any gas hydrate is entirely prevented.

Similarly, the term "formation" includes but not limited to the formation of solid hydrates from water and hydrocarbons or hydrocarbon and non-hydrocarbons, growth, accumulation, agglomeration of hydrates or any combination thereof.

Methods of inhibiting gas hydrate formation in natural gas pipelines include adding a gas hydrate inhibitor composition as described herein to a natural gas pipeline, to inhibit formation of gas hydrates in the natural gas pipeline when a natural gas stream is flowing through the natural gas pipeline. The gas inhibitor composition includes at least one polymer according to formula (I) as previously described, optionally in combination with one or more solvents, one or more additives, or combinations of solvent and additive.

Further methods for inhibiting clathrate hydrates in a fluid capable of forming the clathrate hydrates include contacting the fluid with at least one polymer of formula (I), as previously described, under conditions suitable for forming clathrate hydrates. It should be understood that the term "fluid" encompasses any composition that flows through a gas pipeline, whether physically in a liquid state or in a gaseous state.

The polymer of formula (I) may be dissolved in a solvent. The solvent may include an organic solvent. In one or more embodiments, the solvent includes alcohol, ketonic solvent, or an aromatic solvent.

In illustrative non-limiting embodiments, the polymer of formula (I) may be mixed with an additive. In some embodiments, the additive is mixed with the polymer of formula (I) before adding the polymer of formula (I) to the natural gas pipeline. In other embodiments, the polymer of formula (I) is added to the natural gas pipeline, and then an additive is added to the natural gas pipeline.

The methods of inhibiting gas hydrate formation may include adding the polymer of formula (I) to a natural gas pipeline. In some embodiments, the natural gas pipeline includes hydrogen sulfide and carbon dioxide. In other embodiments, the natural gas pipeline does not include hydrogen sulfide or carbon dioxide.

Under typical operating conditions, the natural gas pipeline has a pressure of from 40 bars to 200 bars. At a pressure of 40 to 200 bars, the polymers of formula (I) act as kinetic hydrate inhibitors (KHIs).

In some embodiments, the natural gas stream in the natural gas pipeline has a water content of from 0.10 to 95.0 weight percent (wt %), based on the total weight of all fluids. In examples, the lower range of water content in the natural gas pipeline may be 0.1 wt %, 0.2 wt %, 0.4 wt %, 0.6 wt %, 0.8 wt %, 1.0 wt %, 1.5 wt %, 2.0 wt %, 3.0 wt %, 4.0 wt %, 5.0 wt %, 6.0 wt %, 7.0 wt %, 8.0 wt %, 9.0 wt %, 10 wt %, and increasing to include 94 wt %. In examples, the upper range of the water content in the natural gas pipeline may be 95 wt %, 94 wt %, 93 wt %, 92 wt %, 91 wt %, 90 wt %, 85 wt %, 80 wt %, 75 wt %, 70 wt %, 65 wt %, 60 wt %, 55 wt %, 50 wt % and decreasing to include less than 1.0 wt %.

In embodiments, the fluid is contacted with a formulation including the at least one polymer of formula (I). In embodiments, the fluid is contacted with about 3 weight % of the formulation, where the amount of formulation relates to the percentage of the water cut. As is commonly understood in the art, the water cut of a fluid sample is the mass of water in the sample, divided by the total mass of all fluids (including the water) in the sample. More specifically, in embodiments, the formulation includes one or more of the at least one polymer of formula (I) (for example, two or more polymers of formula (I) could be used), solvents, or additives. In embodiments, the at least one polymer of formula (I) is compatible with additives.

Examples of additives include corrosion inhibitors and synergists. In illustrative, non-limiting embodiments, the formulation includes from about 0.01 weight % to about 33 weight % of the at least one copolymer of formula (I), from 0 weight % to about 67 weight % of the solvent, and from 0 weight % to about 1 weight % of the additive. In other illustrative, non-limiting embodiments, the formulation includes from about 0.1 weight % to about 5 weight % of the at least one copolymer of formula (I), from 0 weight % to about 20 weight % of the solvent, from 0 weight % to about 10 weight % of the additives, from 0 parts per million (that is, ppm; a mass fraction) to about 3000 ppm of the corrosion inhibitors, from 0 ppm to about 3000 ppm of the scale inhibitors, from 0 weight % to about 40 weight % of the thermodynamic hydrate inhibitors, and from about 0 weight % to about 10 weight % of the anti-agglomerates. In embodiments, the amounts disclosed of the formulation relate to the percentage or ppm of the water cut.

In illustrative, non-limiting embodiments, the solvents are chosen from water, alcohols, for example, monoethylene glycol, methanol, ethanol, and isobutanol, ketones, ethers, and non-polar aromatics, for example, toluene and benzene. In further illustrative, non-limiting embodiments, the solvents are alcohols chosen from glycols, for example, monoethylene glycol. In other illustrative, non-limiting embodiments, the additives are chosen from corrosion inhibitors and synergists. In illustrative, non-limiting embodiments, the corrosion inhibitors include gas corrosion inhibitors. In embodiments, the synergists are chosen from scale inhibitors, thermodynamic hydrate inhibitors, low dose hydrate inhibitors, and anti-agglomerates. In illustrative, non-limiting embodiments, the thermodynamic hydrate inhibitors are chosen from glycol ethers and methanol. In illustrative, non-limiting embodiments, low dose hydrate inhibitors are chosen from Poly(N-vinylcaprolactam) and poly(N-methyl-N-vinylacetamide).

In embodiments, the fluid is contacted with at least one copolymer of formula (I) under conditions suitable for forming clathrate hydrates. In embodiments, the at least one copolymer of formula (I) is contacted with the fluid via methods known to one of ordinary skill in the art. For example, the at least one copolymer of formula (I) may be contacted with the fluid via adding, combining, mixing, injecting, or combination thereof. In illustrative, non-limiting embodiments, conditions suitable for forming clathrate hydrates include conditions where the pressure on the fluid is from about 11 bara to about 200 bara, or from about 11 bara to about 50 bara, or from about 50 bara to about 70 bara, or from about 70 bara to about 100 bara, or from about 100 bara to about 140 bara, or from about 140 bara to about 150 bara, or from about 150 bara to about 200 bara, and also includes conditions where the temperature of the fluid is from about 0° C. to about 25° C., or from about 0° C. to about 10° C., or from about 10° C. to about 12° C., or from about 12° C. to about 16° C., or from about 16° C. to about 19° C., or from about 19° C. to about 20° C., or from about 20° C. to about 25° C. In illustrative, non-limiting embodiments, conditions suitable for forming clathrate hydrates include conditions where the temperature of the fluid is equal to or less than the three-phase equilibrium temperature.

In other embodiments, contacting the fluid with at least one copolymer of formula (I) under conditions suitable for forming the clathrate hydrates is effective to inhibit or inhibits the formation of the clathrate hydrates at a first subcooling temperature. In other embodiments, contacting the fluid with at least one copolymer of formula (I) under conditions suitable for forming the clathrate hydrates is effective to inhibit or inhibits the formation of the clathrate hydrates at a second subcooling temperature. In still other embodiments, contacting the fluid with at least one copolymer of formula (I) under conditions suitable for forming the clathrate hydrates is effective to inhibit or inhibits the formation of the clathrate hydrates at a third subcooling temperature.

In illustrative, non-limiting embodiments, contacting the fluid with at least one copolymer of formula (I) under conditions suitable for forming the clathrate hydrates is effective to inhibit or inhibits the formation of the clathrate hydrates in a pressure range of from about 40 bars to about 200 bars. In other illustrative, non-limiting embodiments, contacting the fluid with at least one copolymer of formula (I) under conditions suitable for forming the clathrate hydrates is effective to inhibit or inhibits the formation of the clathrate hydrates in a pressure range of from about 70 bars to about 100 bars.

In embodiments, the fluid capable of forming clathrate hydrates includes water host molecules and natural gas guest molecules. In further embodiments, the natural gas guest molecules are chosen from methane, ethane, propane, butane, pentane, carbon dioxide, hydrogen sulfide, nitrogen, or combination thereof. In illustrative, non-limiting embodiments, the fluid capable of forming clathrate hydrates includes natural gas guest molecules in the following compositional amounts: methane (from about 60-90 mole %); ethane (from about 0-4 mole %); propane (from about 0-1 mole %); butane (from about 0-1 mole %); carbon dioxide (from about 5-15 mole %); hydrogen sulfide (from about 0-5 mole %); and nitrogen (from about 5-15 mole %). In other illustrative, non-limiting embodiments, the fluid capable of forming clathrate hydrates includes natural gas guest molecules in the following compositional amount: methane (about 79.6 mole %); ethane (about 1.4 mole %); propane (about 0.2 mole %); butane (about 0.1 mole %); carbon dioxide (about 9.2 mole %); hydrogen sulfide (about 2.3 mole %); and nitrogen (about 7.2 mole %) as summarized in TABLE 1.

TABLE 1

| Field Gas Composition | | |
|---|---|---|
| Molecular Formula | Common Name | Mole % |
| $CH_4$ | Methane | (60-90%) |
| $C_2H_6$ | Ethane | (0-4%) |
| $C_3H_8$ | Propane | (0-1%) |
| $C_4H_{10}$ | Butane | (0-1%) |
| $CO_2$ | Carbon Dioxide | (0-15%) |
| $H_2S$ | Hydrogen Sulfide | (0-5%) |
| $N_2$ | Nitrogen | (0-15%) |

In one or more embodiments, the fluid capable of forming clathrate hydrates includes brine, such as is described subsequently in TABLE 2. In illustrative, non-limiting embodiments, the brine includes chloride anions, sodium cations, acetic acid, formic acid, a conjugate base of acetic acid, a conjugate base of formic acid, or combination thereof.

TABLE 2

| Brine water composition | | |
|---|---|---|
| Ion/Molecular Formula | Common Name | Concentration (mg/L) |
| $Cl^-$ | Chloride | 607 |
| $Na^+$ | Sodium | 393 |
| $CH_3COOH$ | Acetic Acid | 500 |
| HCOOH | Formic Acid | 250 |

In illustrative, non-limiting embodiments, the fluid capable of forming clathrate hydrates includes acid gas guest molecules. For example, in some embodiments, the fluid capable of forming clathrate hydrates includes carbon dioxide and hydrogen sulfide. In various embodiments, the fluid capable of forming clathrate hydrates is rich in carbon dioxide, hydrogen sulfide, or a combination of carbon dioxide and hydrogen sulfide. For example, the fluid capable of forming clathrate hydrates may be rich in hydrogen sulfide where it includes at least about 2 mole % of hydrogen sulfide. As another non-limiting example, the fluid capable of forming clathrate hydrates may be rich in carbon dioxide where it includes at least 8 mole % of carbon dioxide. In one or more embodiments, the fluid capable of forming clathrate hydrates may be rich in both carbon dioxide and hydrogen sulfide where it includes at least 8 mole % of carbon dioxide and at least 2 mole % of hydrogen sulfide. In still other illustrative, non-limiting embodiments, the fluid capable of forming clathrate hydrates includes carbon dioxide, hydrogen sulfide, nitrogen, or combination thereof. In yet other illustrative, non-limiting embodiments, the fluid capable of forming clathrate hydrates includes methane, ethane, propane, butane, carbon dioxide, hydrogen sulfide, and nitrogen gas guest molecules. In yet still other illustrative, non-limiting embodiments, the fluid capable of forming clathrate hydrates does not include hydrogen sulfide, carbon dioxide, or a combination of hydrogen sulfide and carbon dioxide.

In embodiments, the fluid capable of forming clathrate hydrates is capable of forming SI clathrate hydrates, SII clathrate hydrates, SH clathrate hydrates, or combination thereof. In embodiments, fluids capable of forming SI clathrate hydrates include at least one of methane, ethane, propane, butane, carbon dioxide, or hydrogen sulfide. In embodiments, fluids capable of forming SII clathrate hydrates include at least one of propane, butane, or pentane. In embodiments, SI clathrate hydrates and SII clathrate hydrates have crystalline cubic structures which are well known to one of ordinary skill in the art. In embodiments, SH clathrate hydrates have hexagonal structures which are well known to one of ordinary skill in the art. In further embodiments where the fluid capable of forming clathrate hydrates is capable of forming SI clathrate hydrates, SII clathrate hydrates, SH clathrate hydrates, or combination thereof, the contacting is effective to inhibit or inhibits formation of SI clathrate hydrates, SII clathrate hydrates, SH clathrate hydrates, or combination thereof.

The polymers formula (I) are evaluated for hydrate inhibition properties under simulated gas pipeline condition in a set-up called "rocking cells (RC-5)."

The RC-5 set-up consists of five Hastelloy cells capable of operating under high pressure (maximum 200 bars) and sour gas conditions. The Hastelloy cells are immersed in one temperature-controlled bath containing ethylene glycol and water. During operation, the RC-5 is rocked ensuring that the fluid slurry is well-mixed. The RC-5 enables the formation of natural gas clathrate hydrate under simulated operating conditions to test KHI effectiveness. TABLE 3 summarizes the applied testing protocol.

TABLE 3

| Programmed temperature stages in the RC-5 | | | | |
|---|---|---|---|---|
| Stage | Start Temp (° C.) | Average Ramp (° C./min) | $T_{sc}$ (° C./min) | Duration (hours) |
| S-1 | 14.6 | 0.1 | 4 | 24 to 120 |
| S-2 | 13 | 0.1 | 5.6 | 2-24 |
| S-3 | 8.1 | 0.08 | 10.5 | 2 to 8 |

To simulate the field natural gas pipeline operating conditions a brine and natural gas are specially prepared and mixed. The brine is an aqueous solution of sodium chloride, acetic acid, and formic acid (along with conjugate bases) having the composition mentioned in TABLE 2.

Field natural gas contains primarily methane, carbon dioxide, hydrogen sulfide, and nitrogen with small amounts of ethane, propane, and butane having the composition presented in TABLE 1. The polymer of formula (I) is evaluated in the form of a formulation in MEG using the RC-5 technique.

Items Listing

The present disclosure includes at least the following items, which are not intended to limit the scope of the disclosure as a whole or the appended claims.

Item 1: A gas hydrate inhibitor composition comprising a random polymer according to formula (I) as described herein, where $R^1$ is independently $(C_4$-$C_7)$hydrocarbylene or $(C_4$-$C_7)$heterohydrocarbylene and is optionally substituted with at least one $(C_1$-$C_3)$alkyl; $R^2$ is independently $(C_1$-$C_{10})$ hydrocarbyl or $(C_1$-$C_{10})$heterohydrocarbyl; $R^3$ is independently hydrogen or $(C_1$-$C_8)$ saturated alkyl; $R^4$ is independently $(C_1$-$C_8)$ saturated alkyl; each $R^6$ is independently selected from hydrogen, methyl, ethyl, or —$CH_2OH$; each $R^7$ is independently selected from hydrogen, $(C_1$-$C_5)$alkyl, dialkylamine, or —CN; x is a molar fraction from 0 to 0.99;

y is a molar fraction from 0.01 to 0.50; z is a molar fraction from 0 to 0.99; the sum of x and z is from 0.50 to 0.99; and the sum of x, y, and z is 1.

Item 2: The gas hydrate inhibitor composition of Item 1, wherein: x is from 0 to 0.40; y is from 0.05 to 0.20; z is from 0 to 0.40; and the sum of x and z is from 0.80 to 0.95.

Item 3: The gas hydrate inhibitor composition of Item 1 or 2, wherein the random polymer according to formula (I) has a weight average molecular weight from 500 g/mol to 25,000 g/mol.

Item 4: The gas hydrate inhibitor composition of an of Items 1 to 3, wherein z is zero, each $R^7$ is hydrogen, and the random polymer according to formula (I) has formula (Ia) as described herein, where: $R^{1a}$ and $R^{1b}$ are selected from $(C_4\text{-}C_7)$hydrocarbylene or $(C_4\text{-}C_7)$heterohydrocarbylene, and are optionally substituted with at least one $(C_1\text{-}C_3)$alkyl; Ria and $R^{1b}$ are different from each other; each $R^6$ is as defined in formula (I); a and b are respective molar fractions, based on only the monomers adding to the molar fraction x of the random polymer; a and b are from 0.30 to 0.70, where the sum of a and b is 1; x is from 0.50 to 0.99; and y is from 0.01 to 0.50.

Item 5: The gas hydrate inhibitor composition of Item 4, wherein: $R^{1a}$ and $R^{1b}$ are independently a $(C_4\text{-}C_7)$alkylene or a $(C_4\text{-}C_7)$heteroalkylene comprising at least one heteroatom selected from the group consisting of oxygen, nitrogen, and sulfur; and $R^2$ is $(C_1\text{-}C_5)$alkyl or $(C_4\text{-}C_5)$cycloalkyl.

Item 6: The gas hydrate inhibitor of Item 4, wherein: $R^{1a}$ is $—(CH_2)_4—$; $R^{1b}$ is $—(CH_2)_5—$; $R^2$ is methyl; and the polymer according to formula (Ia) has a weight average molecular weight from 500 g/mol to 25,000 g/mol.

Item 7: The gas hydrate inhibitor composition of any of Items 1 to 6, wherein the polymer according to formula (I) is dissolved in a solvent chosen from monoethylene glycol, diethylene glycol monomethyl ether, butoxy ethanol, and combinations thereof.

Item 8: A natural gas pipeline comprising a natural gas stream and a gas hydrate inhibitor composition according to any of Items 1 to 7 in fluidic communication with the natural gas stream.

Item 9: The natural gas pipeline of Item 8, wherein the natural gas stream has a water content from 0.10 wt. % to 95.0 wt. %, based on the total weight of all fluids in the natural gas stream.

Item 10: The natural gas pipeline of Item 8 or 9, wherein the natural gas pipeline has a pressure of from 40 bars to 200 bars.

Item 11: A method of inhibiting gas hydrate formation in natural gas pipelines, the method comprising: adding a gas hydrate inhibitor composition according to any of Items 1 to 7 to a natural gas pipeline, to inhibit formation of gas hydrates in the natural gas pipeline when a natural gas stream is flowing through the natural gas pipeline.

Item 12: A method of preparing a gas hydrate inhibitor composition according to any of Items 1 to 7, the method comprising: polymerizing alkyl acrylate monomers by free radical polymerization to obtain a poly(alkyl acrylate), the alkyl acrylate monomers having formula (II) as described herein, where $R^2$, $R^4$, and $R^7$ are as defined in formula (I); the poly(alkyl acrylate) having formula (III) as described herein where $R^2$ and $R^4$ are as defined in formula (I), and n is from 5 to 500; and reacting the poly(alkyl acrylate) of formula (III) with at least one amine compound in the presence of a proton acceptor to obtain the polymer of formula (I) upon replacement of fewer than all groups $—OR^2$ of the poly(alkyl acrylate) with an amine from the at least one amine compound, the at least one amine compound being selected from compounds according to formula (IV) as described herein, compounds according to formula (V) as described herein, and combinations thereof, where $R^1$, $R^3$, and $R^4$ are as defined in formula (I).

Item 13: The method of Item 12, wherein the proton acceptor is triazabicyclodecene.

Item 14: The method of Item 12 or 13, wherein the compounds of formula (IV) and the compounds of formula (V) are selected from substituted piperidine, unsubstituted piperidine, substituted pyrrole, or unsubstituted pyrrole.

Item 15: The method of any of Items 12 to 14, wherein the poly(alkyl acrylate) is reacted with a first amine compound of formula (IV) or formula (V) and a second amine compound of formula (IV) or formula (V) in a single reaction or in two separate reactions.

EXAMPLES

The following examples are provided to describe a synthesis and characterization of example polymers having formula (I) and to illustrate methods of the present disclosure. The examples should be understood to be illustrative in nature and in no regard limiting to the scope of formula (I) or of the methods described.

COMPARATIVE EXAMPLES

Three known clathrate inhibiting polymers, KHI-A, KHI-B, and KHI-C were obtained as bases for comparison with clathrate inhibition characteristics of polymers according to formula (I) prepared according to methods of this disclosure. Polymers KHI-A and KHI-C were prepared from acryloyl monomers, as described in U.S. Pat. No. 10,550,215. Polymer KHI-B was prepared also from acryloyl monomers, as described in U.S. Pat. No. 10,189,986. The structures of these comparative polymers are provided in the following TABLE 4:

TABLE 4

| Comparative polymers | |
|---|---|
| Examples | Structure |
| KHI-A (Comparative) | 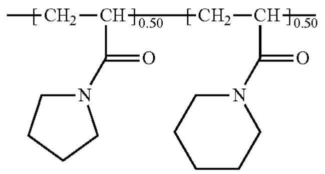 |

TABLE 4-continued

| Comparative polymers | |
| --- | --- |
| Examples | Structure |
| KHI-B (Comparative) | 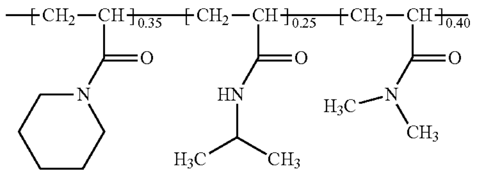 |
| KHI-C (Comparative) | 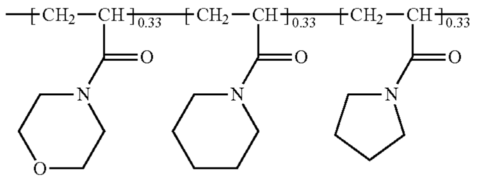 |

Example 1

Preparation of PMA Homopolymer

Examples 1 and 2 in combination describe a synthesis of a polymer according to formula (I) of this disclosure. In a first part of the synthesis described in this Example 1, a poly(methyl acrylate) (PMA) homopolymer was prepared. In a second part of the synthesis described in Example 2, the polymethacrylate homopolymer was modified by reacting a portion of the methacrylate monomers with an amine-containing compound.

To prepare PMA, the monomer methyl acrylate (1.25 g, 14.52 mmole), 2,2-Azobis cyanovaleric acid initiator (70 mg, 0.25 mmole), thioglycolic acid (0.193 g, 2.1 mmole), and N,N-dimethyl formamide (5 mL) were added to a three-neck round-bottom flask equipped with a reflux condenser to form a reaction mixture. The reaction mixture was stirred under nitrogen for 8 hours at 70° C. The PMA polymer was precipitated using diethyl ether, and the final PMA polymer was dried in a vacuum oven at 45° C. for 8 hours.

Example 2

Modification of PMA Homopolymer to Polymer of Formula (I)

Modification of the PMA homopolymer prepared according to Example 1 was accomplished by the following reaction scheme in a single step:

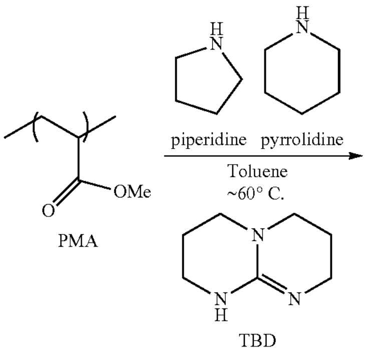

-continued

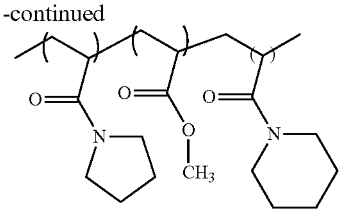

terpolymer

Poly(methyl acrylate) (1.0 g) prepared according to Example 1 was added to a three-neck round-bottom flask with a stir bar in a closed system, along with 5 mL of toluene. To this mixture, piperidine and triazabicyclodecene (TBD) were added, both in 0.5 equimolar amounts, relative to the poly(methyl acrylate). The mixture was stirred for 8 hours at 70° C. After the stirring, pyrrolidine was added to the solution at a 0.5 equimolar amount, relative to the poly(methyl acrylate), and the solution was stirred for additional 48 hours. At the end of the reaction, volatile solvents were removed using a rotary evaporator. The final polymer was washed with dichloromethane (DCM), and the remaining DCM was distilled off. The polymer was further washed with 1 N hydrochloric acid.

A formulation PKHI-1 was prepared for further testing by combining the polymer with mono ethylene glycol (MEG) to form a solution of 30% by mass polymer and 70% by mass MEG.

The synthesized polymers were characterized using $^{1}H$ and $^{13}C\{^{1}H\}$ NMR spectroscopy. A Varian 500 MHz VNMRS and a JEOL 500 MHz NMR spectrometers were utilized to obtain spectra using appropriate acquisition parameters. The $^{1}H$ and $^{13}C\{^{1}H\}$ analysis were carried in deuterated methanol and chloroform, water ($D_2O$), and the chemical shifts were set to those of deuterated trimethylsilyl propanoic acid (0 ppm). The NMR analysis confirmed the structures of both PMA and final modified terpolymer (PKHI-1).

Figure 3:
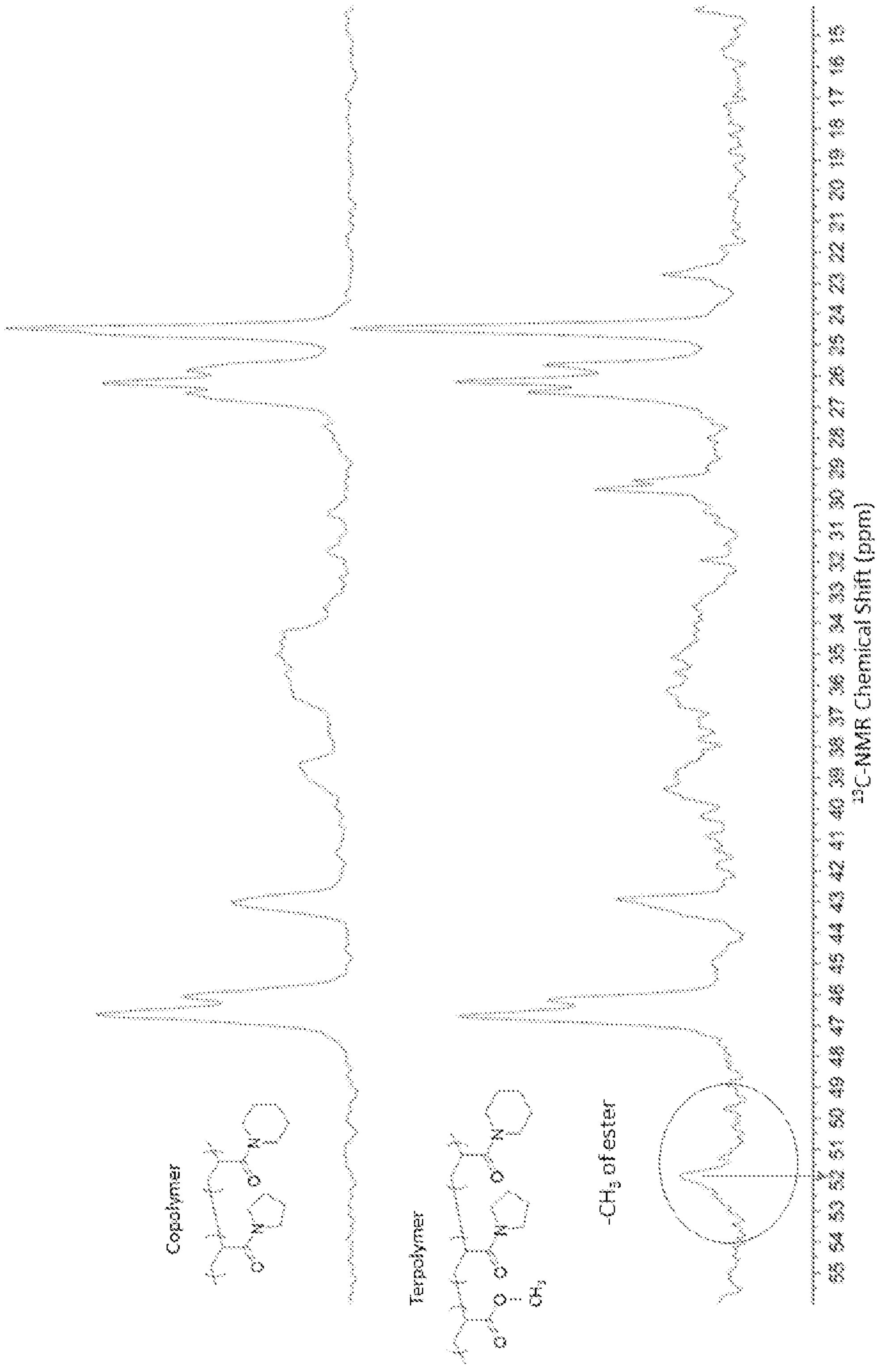
FIG. 3 shows stacked Carbon NMR ($^{13}$C-NMR) spectra of methyl acrylate monomer, poly(methyl acrylate), the terpolymer according to this disclosure, and ethylene glycol.

The typical peaks of the double bond of monomer are present at 6.0 ppm, 6.3 ppm, and 5.7 ppm. The $—OCH_3$ group of esters of monomer has a typical peak at 3.65 ppm. During the formation of the polymer, all peaks belong to double bond disappeared. The PMA polymer has distinct peaks of —CH (1.10 ppm-1.90 ppm) and $—CH_2$ group at 12.28 ppm as shown in FIG. 3. The terpolymer (PKHI-1) has peaks of 1.5-1.9 ppm, 2.5 ppm, 3.4-3.5 ppm of acrylamide groups and there is a small amount of ester group —$OCH_3$ at 3.65 ppm. There is roughly 13% ester group present in the final terpolymer. The presence of the ester group confirmed the formation of terpolymer with two acrylamide groups generated from piperidine and pyrrolidine groups in the terpolymer.

Using the method previously described, the polymers of TABLE 5 were produced:

TABLE 5

Polymers of formula (I) tested in the present Examples

| Examples | Structure |
|---|---|
| PKHI-1 | 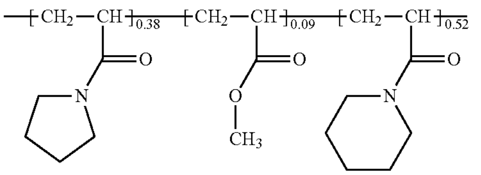 |
| PKHI-1A | 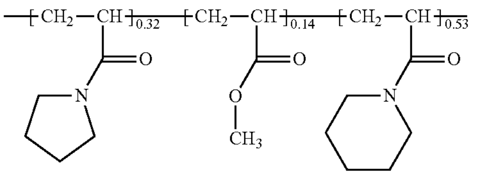 |

Figure 4:
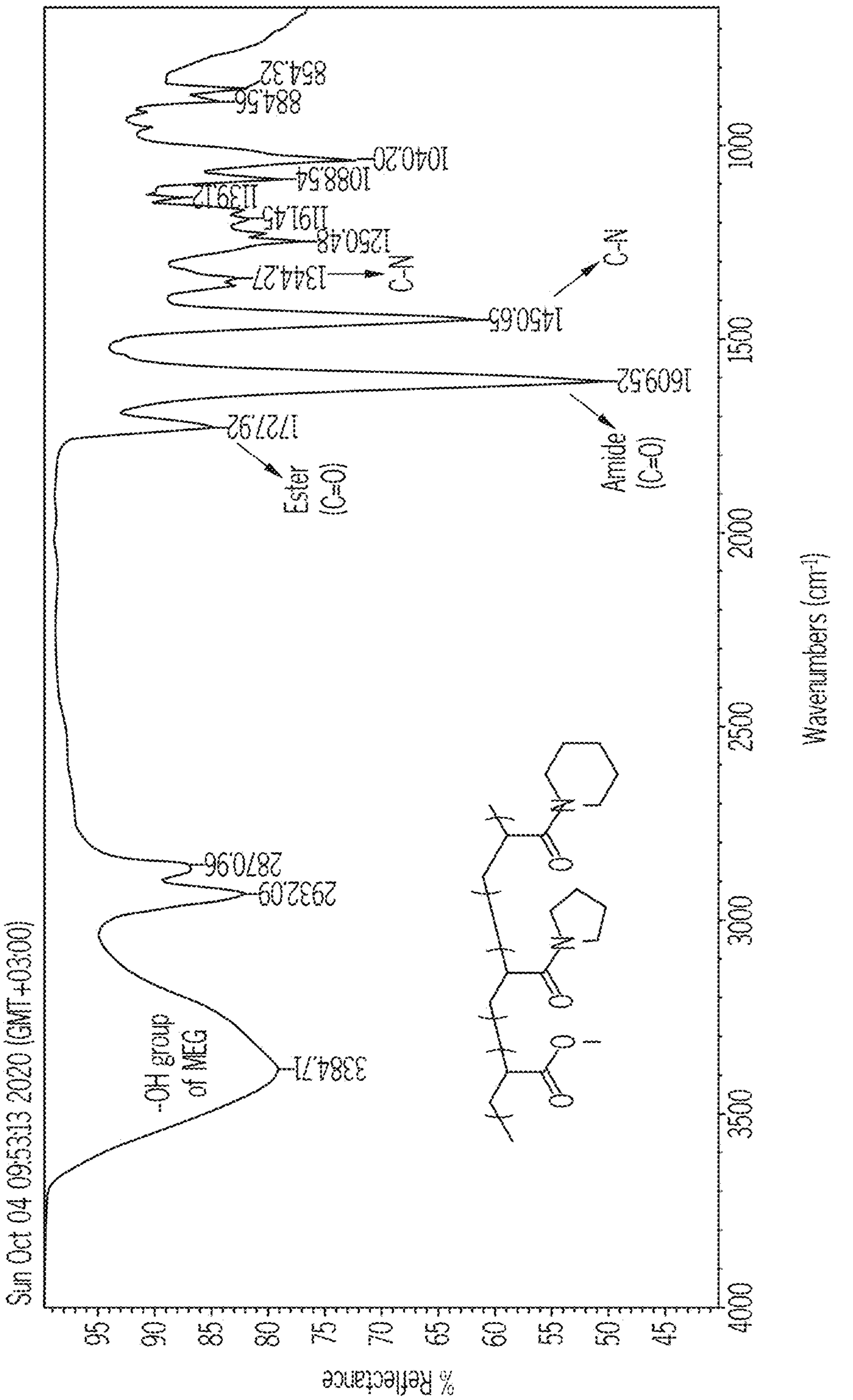
FIG. 4 is a Fourier Transform Infrared (FT-IR) spectrum of PKHI-1 in the solvent monoethylene glycol (MEG).

FIG. 4 shows the FT-IR spectra of PKHI-1 in the solvent monoethylene glycol (MEG). In a mass spectrometry, the composition breakdown included block A ($C_7H_{11}NO$, 125 Da), block B ($C_8H_{13}NO$, 139 Da), and block C ($C_7H_{11}NO$, 125 Da) in PKHI-1 polymer ($C_4H_6O_2$, 85 Da).

Example 2

Performance Evaluation

The performance was evaluated at 140 bar and dosage of 2.0% to 4.0% of the polymers using the field gas composition given in TABLE 1 of this disclosure. The testing was conducted over 98 hours in three phases. In the first phase, beginning at time zero, a temperature of 14.5° C., representing a subcooling of 4.0° C. relative to 18.5° C., was applied for 72 hours. In the second phase, beginning at the 72-hour point of the test as a whole, a temperature of 13° C., representing a subcooling of 5.6° C., was applied for 24 hours. In the third phase, beginning at the 96-hour point of the test as a whole, a temperature of 10.5° C., representing a subcooling of 8.1° C., was applied for the final two hours of the test.

The copolymers (KHI-A, KHI-B, and KHI-C) were produced from acryloyl monomers and here results are presented for comparison only. The copolymer (KHI-A) hydrate onset occurred 15 hours into the second stage, which is 87 hours accumulated time of three subcooling stages. The polymer of formula (I) (PKHI-IA) performance was evaluated at 2% and 2.5% dosage at 140 bars.

The KHI copolymer and terpolymers were prepared through the post-modification of the polymer. The copolymer and terpolymer were tested at three subcooling temperatures at 4.0° C., 5.6° C., and 10.5° C. to determine the induction period and the temperature at which hydrate formation occurred. The modified terpolymer structures successfully passed the three stages of subcooling with high potential for field deployment.

The PKHI-IA terpolymer showed no hydrate formation through the entire duration of the test. Detailed results are summarized in TABLE 6.

TABLE 6

Performance of comparative polymers and PKHI-1A polymer of formula (I) at 140° C. bar at 2% to 4% dosage

| | Formulation | | Dose | Hydrate onset time (hr) | | |
|---|---|---|---|---|---|---|
| | | | | Phase 1 | Phase 2 | Phase 3 |
| | Polymer (wt. %) | Solvent (wt. %) | rate (Vol. %) | T = 14.5° C. (72 hr) | T = 13° C. (24 hr) | T = 10.5° C. (2 hr) |
| | No KHI (control) | | 0 | 0.2 hrs | N/A | N/A |
| Comparative | KHI-A (30%) | MEG (70%) | 2.0 | No hydrate | 15 hrs | N/A |
| Comparative | KHI-B (35%) | MEG (65%) | 3.0 | No hydrate | 17 hrs | N/A |
| Comparative | KHI-C (35%) | MEG (65%) | 3.0 | No hydrate | No hydrate | N/A |
| Formula (I) | PKHI-1A (30%) | MEG (70%) | 2.0 | No hydrate | No hydrate | 0.5 hrs |
| Formula (I) | PKHI-1A (30%) | MEG (70%) | 3.5 | No hydrate | No hydrate | 3.0 hrs |
| Formula (I) | PKHI-1A (30%) | MEG (70%) | 4.0 | No hydrate | No hydrate | 4.5 hrs |

In further testing, polymer PHKI-1 was compared to KHI-A and KHI-B in a similar three phase test of 34-hour total duration. In the first phase, beginning at time zero, a temperature of 14.6° C., representing a subcooling of 4.0° C. relative to 18.5° C., was applied for 24 hours. In the second phase, beginning at the 24-hour point of the test as a whole, a temperature of 13° C., representing a subcooling of 5.6° C., was applied for 2 hours. In the third phase, beginning at the 26-hour point of the test as a whole, a temperature of 10.5° C., representing a subcooling of 8.1° C., was applied for the final 8 hours of the test. In all tests, the onset of hydrate formation was significantly later for the PKHI-1 than for the comparative polymers KHI-A and KHI-B. Results from these tests are provided in TABLE 7.

TABLE 7

Performance of comparative polymers and PKHI-1 polymer of formula (I) at 140° C. bar at 2% and 2.5% dosage

| | Formulation | | Dose | Hydrate onset time (hr) | | |
|---|---|---|---|---|---|---|
| | | | | Phase 1 | Phase 2 | Phase 3 |
| | Polymer (wt. %) | Solvent (wt. %) | rate (Vol. %) | T = 14.6° C. (24 hr) | T = 13° C. (2 hr) | T = 10.5° C. (8 hr) |
| | No KHI | (control) | 0 | 0.2 hrs | N/A | N/A |
| Comparative | KHI-A (30%) | MEG (70%) | 2.5 | No hydrate | 15 hrs | 1.4 hrs |
| Comparative | KHI-B (35%) | MEG (65%) | 3.0 | No hydrate | No hydrate | N/A |
| Formula (I) | PKHI-1 (30%) | MEG (70%) | 2.0 | No hydrate | No hydrate | 2.5 hrs |
| Formula (I) | PKHI-1 (30%) | MEG (70%) | 2.5 | No hydrate | No hydrate | 5.5 hrs |
| Formula (I) | PKHI-1 (30%) | MEG (70%) | 2.5 | No hydrate | No hydrate | 8.0 hrs |

The PKHI-IA polymer of formula (I) was further evaluated with a controlled solvent system as part of the formulation to ascertain the lowest practical dose rate. A two-phase subcooling schedule was used, with a first pohase at 13° C. for 24 hours, followed by a second phase at 10.5° C. for two hours. At dose rates of 1.5% to 3.0%, no hydrate was formed through the duration of the tests. At a dose rate of 1.25%, hydrate formed after 15 hours. These data are summarized in TABLE 8.

TABLE 8

Evaluation of hydrate onset time at various dose rates for PKHI-1A of formula (I)

| Formulation | | | Hydrate onset time (hrs) | |
|---|---|---|---|---|
| | | | Phase 1 | Phase 2 |
| Polymer (wt. %) | Solvents (wt. % based on total) | Dose rate (vol. %) | T = 13° C. (24 hrs) | T = 10.5° C. (2 hrs) |
| PKHI-1A (35%) | MEG (33%) DGME (15%) 2-Butoxyethanol (15%) | 3.0% | No hydrate | N/A |
| PKHI-1A (35%) | MEG (33%) DGME (15%) 2-Butoxyethanol (15%) | 2.0% | No hydrate | N/A |
| PKHI-1A (35%) | MEG (33%) DGME (15%) 2-Butoxyethanol (15%) | 1.5% | No hydrate | N/A |

TABLE 8-continued

Evaluation of hydrate onset time at various dose rates for PKHI-1A of formula (I)

| Formulation | | | Hydrate onset time (hrs) | |
|---|---|---|---|---|
| | | | Phase 1 | Phase 2 |
| Polymer (wt. %) | Solvents (wt. % based on total) | Dose rate (vol. %) | T = 13° C. (24 hrs) | T = 10.5° C. (2 hrs) |
| PKHI-1A (35%) | MEG (33%) DGME (15%) 2-Butoxyethanol (15%) | 1.25% | 15 hrs | N/A |

The foregoing results demonstrate that the polymers according to formula (I) as described in this disclosure not only provide the benefit of inhibiting gas hydrate or clathrate formation in natural gas pipelines but also do so at a level of effectiveness exceeding that of comparative polymers that lack acrylate ester monomers.

What is claimed is:

1. A gas hydrate inhibitor composition comprising a random polymer according to formula (I):

(I)

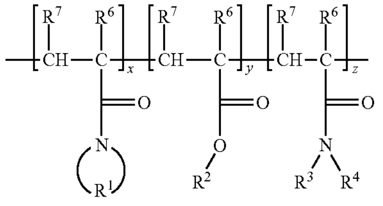

where:

$R^1$ is independently ($C_4$-$C_7$) hydrocarbylene or ($C_4$-$C_7$) heterohydrocarbylene and is optionally substituted with at least one ($C_1$-$C_3$) alkyl;

$R^2$ is independently ($C_1$-$C_{10}$) hydrocarbyl or ($C_1$-$C_{10}$) heterohydrocarbyl;

$R^3$ is independently hydrogen or ($C_1$-$C_8$) saturated alkyl;

$R^4$ is independently ($C_1$-$C_8$) saturated alkyl;

each $R^6$ is independently selected from hydrogen, methyl, ethyl, or $CH_2OH$;

each $R^7$ is independently selected from hydrogen, ($C_1$-$C_5$) alkyl, dialkylamine, or —CN;

x is a molar fraction from 0 to 0.99;

y is a molar fraction from 0.01 to 0.50;

z is a molar fraction from 0 to 0.99;

the sum of x and z is from 0.50 to 0.99; and the sum of x, y, and z is 1.

2. The gas hydrate inhibitor composition of claim 1, wherein:

x is from 0 to 0.40;

y is from 0.05 to 0.20;

z is from 0 to 0.40; and the sum of x and z is from 0.80 to 0.95.

3. The gas hydrate inhibitor composition of claim 2, wherein the random polymer according to formula (I) has a weight average molecular weight from 500 g/mol to 25,000 g/mol.

4. The gas hydrate inhibitor composition of claim 1, wherein z is zero, each $R^7$ is hydrogen, and the random polymer according to formula (I) has formula (Ia):

(Ia)

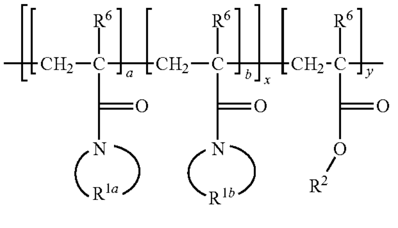

where:

$R^{1a}$ and $R^{1b}$ are selected from ($C_4$-$C_7$) hydrocarbylene or ($C_4$-$C_7$) heterohydrocarbylene, and are optionally substituted with at least one ($C_1$-$C_3$) alkyl;

$R^{1a}$ and $R^{1b}$ are different from each other;

each $R^6$ is as defined in formula (I);

a and b are respective molar fractions, based on only the monomers adding to the molar fraction x of the random polymer;

a and b are from 0.30 to 0.70, where the sum of a and b is 1;

x is from 0.50 to 0.99; and y is from 0.01 to 0.50.

5. The gas hydrate inhibitor composition of claim 4, wherein:

$R^{1a}$ and $R^{1b}$ are independently a ($C_4$-$C_7$) alkylene or a ($C_4$-$C_7$) heteroalkylene comprising at least one heteroatom selected from the group consisting of oxygen, nitrogen, and sulfur; and $R^2$ is ($C_1$-$C_5$) alkyl or ($C_4$-$C_5$) cycloalkyl.

6. The gas hydrate inhibitor of claim 4, wherein:

$R^{1a}$ is $—(CH_2)_4—$;

$R^{1b}$ is $—(CH_2)_5—$;

$R^2$ is methyl; and the polymer according to formula (Ia) has a weight average molecular weight from 500 g/mol to 25,000 g/mol.

7. The gas hydrate inhibitor composition of claim 1, wherein the polymer according to formula (I) is dissolved in a solvent chosen from monoethylene glycol, diethylene glycol monomethyl ether, butoxy ethanol, and combinations thereof.

8. A natural gas pipeline comprising a natural gas stream and a gas hydrate inhibitor composition according to claim 7 in fluidic communication with the natural gas stream.

9. The natural gas pipeline of claim 8, wherein the natural gas stream has a water content from 0.10 wt. % to 95.0 wt. %, based on the total weight of all fluids in the natural gas stream.

10. The natural gas pipeline of claim 8, wherein the natural gas pipeline has a pressure of from 40 bars to 200 bars.

11. A method of inhibiting gas hydrate formation in natural gas pipelines, the method comprising:

adding a gas hydrate inhibitor composition according to claim 1 to a natural gas pipeline, to inhibit formation of gas hydrates in the natural gas pipeline when a natural gas stream is flowing through the natural gas pipeline.

12. A method of preparing a gas hydrate inhibitor composition according to claim 1, the method comprising:

polymerizing alkyl acrylate monomers by free radical polymerization to obtain a poly (alkyl acrylate), wherein:

the alkyl acrylate monomers have formula (II):

(II)

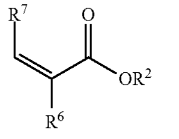

the poly (alkyl acrylate) having has formula (III):

(III)

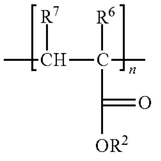

and $R^2$, $R^6$, and $R^7$ in formulas (II) and (III) are as defined in formula (I), and n is from 5 to 500; and reacting the poly (alkyl acrylate) of formula (III) with at least one amine compound in the presence of a proton acceptor to obtain the polymer of formula (I) upon replacement of fewer than all groups —$OR^2$ of the poly (alkyl acrylate) with an amine from the at least one amine compound, the at least one amine compound being selected from compounds according to formula (IV), compounds according to formula (V), and combinations thereof:

(IV)

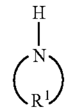

(V)

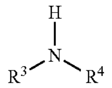

where $R^1$, $R^3$, and $R^4$ are as defined in formula (I).

13. The method of claim 12, wherein the proton acceptor is triazabicyclodecene.

14. The method of claim 12, wherein the compounds of formula (IV) and the compounds of formula (V) are selected from substituted piperidine, unsubstituted piperidine, substituted pyrrole, or unsubstituted pyrrole.

15. The method of claim 12, wherein the poly (alkyl acrylate) is reacted with a first amine compound of formula (IV) or formula (V) and a second amine compound of formula (IV) or formula (V) in a single reaction or in two separate reactions.

16. A method of preparing a gas hydrate inhibitor composition according to claim 4, the method comprising:

polymerizing alkyl acrylate monomers by free radical polymerization to obtain a poly (alkyl acrylate), wherein:

the alkyl acrylate monomers have formula (II):

(II)

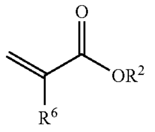

the poly (alkyl acrylate) has formula (III):

(III)

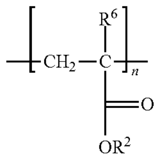

and $R^2$ and $R^6$ in formulas (II) and (III) are as defined in formula (Ia), and n is from 5 to 500; and reacting the poly (alkyl acrylate) of formula (III) with two unique amine compounds in the presence of a proton acceptor to obtain the polymer of formula (Ia) upon replacement of fewer than all groups —$OR_2$ of the poly (alkyl acrylate) with the two unique amine compounds, the two unique amine compounds being selected from compounds according to formula (IV):

(IV)

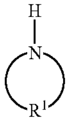

where $R^1$ is ($C_4$-$C_7$) hydrocarbylene or ($C_4$-$C_7$) heterohydrocarbylene and is optionally substituted with at least one ($C_1$-$C_3$) alkyl.

17. The method of claim 16, wherein:

the proton acceptor is triazabicyclodecene;

the compounds of formula (IV) are selected from substituted piperidine, unsubstituted piperidine, substituted pyrrole, or unsubstituted pyrrole; and the poly (alkyl acrylate) is reacted with a first amine compound of formula (IV) and a second amine compound of formula (IV) in a single reaction or in two separate reactions.

18. The gas hydrate inhibitor composition of claim 4, wherein:

x is from 0.80 to 0.95;

y is from 0.05 to 0.20;

$R^{1a}$ and $R^{1b}$ are independently a ($C_4$-$C_7$) alkylene or a ($C_4$-$C_7$) heteroalkylene comprising at least one heteroatom selected from the group consisting of oxygen, nitrogen, and sulfur; and $R^2$ is ($C_1$-$C_5$) alkyl or ($C_4$-$C_5$) cycloalkyl.

19. The gas hydrate inhibitor composition of claim 18, wherein:

$R^{1a}$ is —$(CH_2)_4$—;

$R^{1b}$ is —$(CH_2)_5$—; and $R^2$ is methyl.

20. The gas hydrate inhibitor composition of claim 19, the polymer according to formula (Ia) has a weight average molecular weight from 500 g/mol to 25,000 g/mol.

* * * * *